United States Patent
McClintock et al.

(10) Patent No.: US 10,002,177 B1
(45) Date of Patent: *Jun. 19, 2018

(54) CROWDSOURCED ANALYSIS OF DECONTEXTUALIZED DATA

(71) Applicant: AMAZON TECHNOLOGIES, INC., Reno, NV (US)

(72) Inventors: Jon Arron McClintock, Seattle, WA (US); George Nikolaos Stathakopoulos, Seattle, WA (US); Dominique Imjya Brezinski, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/028,360

(22) Filed: Sep. 16, 2013

(51) Int. Cl.
*G06F 17/30* (2006.01)

(52) U.S. Cl.
CPC ............... *G06F 17/30595* (2013.01)

(58) Field of Classification Search
CPC ............. G06F 21/577; G06F 17/30156; G06F 17/30303
USPC ............... 707/736; 709/204; 726/25
See application file for complete search history.

(56) References Cited

U.S. PATENT DOCUMENTS

| | | | |
|---|---|---|---|
| 6,940,975 B1 | 9/2005 | Kawamura et al. | |
| 8,484,015 B1* | 7/2013 | Wolfram | G06F 17/30654 704/1 |
| 8,903,973 B1* | 12/2014 | Hindawi | G06F 17/30283 709/217 |
| 2002/0169595 A1 | 11/2002 | Agichtein et al. | |
| 2004/0230586 A1* | 11/2004 | Wolman | G06K 9/6251 707/707 |
| 2008/0187057 A1 | 8/2008 | Qu | |
| 2010/0191686 A1 | 7/2010 | Wang et al. | |
| 2012/0137367 A1* | 5/2012 | Dupont | G06F 21/00 726/25 |
| 2012/0158623 A1 | 6/2012 | Bilenko et al. | |
| 2012/0259877 A1 | 10/2012 | Raghunathan et al. | |
| 2013/0018960 A1* | 1/2013 | Knysz | G06Q 50/01 709/204 |

(Continued)

OTHER PUBLICATIONS

Sobkowski, Isidore S., "Non-Final Office Action dated Jul. 16, 2015", U.S. Appl. No. 14/028,396, The United States Patent and Trademark Office, filed Jul. 16, 2015.

(Continued)

*Primary Examiner* — Robert Beausoliel, Jr.
*Assistant Examiner* — Alexandria Bromell
(74) *Attorney, Agent, or Firm* — Lindauer Law, PLLC

(57) ABSTRACT

Techniques are described for employing a crowdsourcing framework to analyze data related to the performance or operations of computing systems, or to analyze other types of data. A question is analyzed to determine data that is relevant to the question. The relevant data may be decontextualized to remove or alter contextual information included in the data, such as sensitive, personal, or business-related data. The question and the decontextualized data may then be presented to workers in a crowdsourcing framework, and the workers may determine an answer to the question based on an analysis or an examination of the decontextualized data. The answers may be combined, correlated, or otherwise processed to determine a processed answer to the question.

20 Claims, 15 Drawing Sheets

(56) References Cited

U.S. PATENT DOCUMENTS

| | | | |
|---|---|---|---|
| 2013/0035931 A1 | 2/2013 | Ferrucci et al. | |
| 2013/0132308 A1 | 5/2013 | Boss et al. | |
| 2013/0159404 A1* | 6/2013 | Pfaff | G06F 17/30867 709/204 |
| 2014/0075004 A1* | 3/2014 | Van Dusen | H04L 41/04 709/223 |
| 2014/0135381 A1* | 5/2014 | Hadwiger | A61K 47/60 514/44 R |
| 2014/0136381 A1* | 5/2014 | Joseph | G06Q 40/02 705/35 |

OTHER PUBLICATIONS

Sobkowski, Isidore S., "Notice of Allowance dated Jan. 29, 2016", U.S. Appl. No. 14/028,396, The United States Patent and Trademark Office, filed Jan. 29, 2016.

\* cited by examiner

US 10,002,177 B1

CROWDSOURCED ANALYSIS OF DECONTEXTUALIZED DATA

BACKGROUND

To identify errors, security breaches, or other anomalous behavior in computing systems, system administrators may implement automated checks. Such automated checks may be performed by processes that periodically execute to analyze performance data or other types of data captured during the operation of the computing system being checked. In many cases, the processes to implement automated checks may not be adequate to identify anomalous behavior in computing systems, particularly when the anomalous behavior is subtle or is indicated by patterns or correlations in the data.

Figure 1:
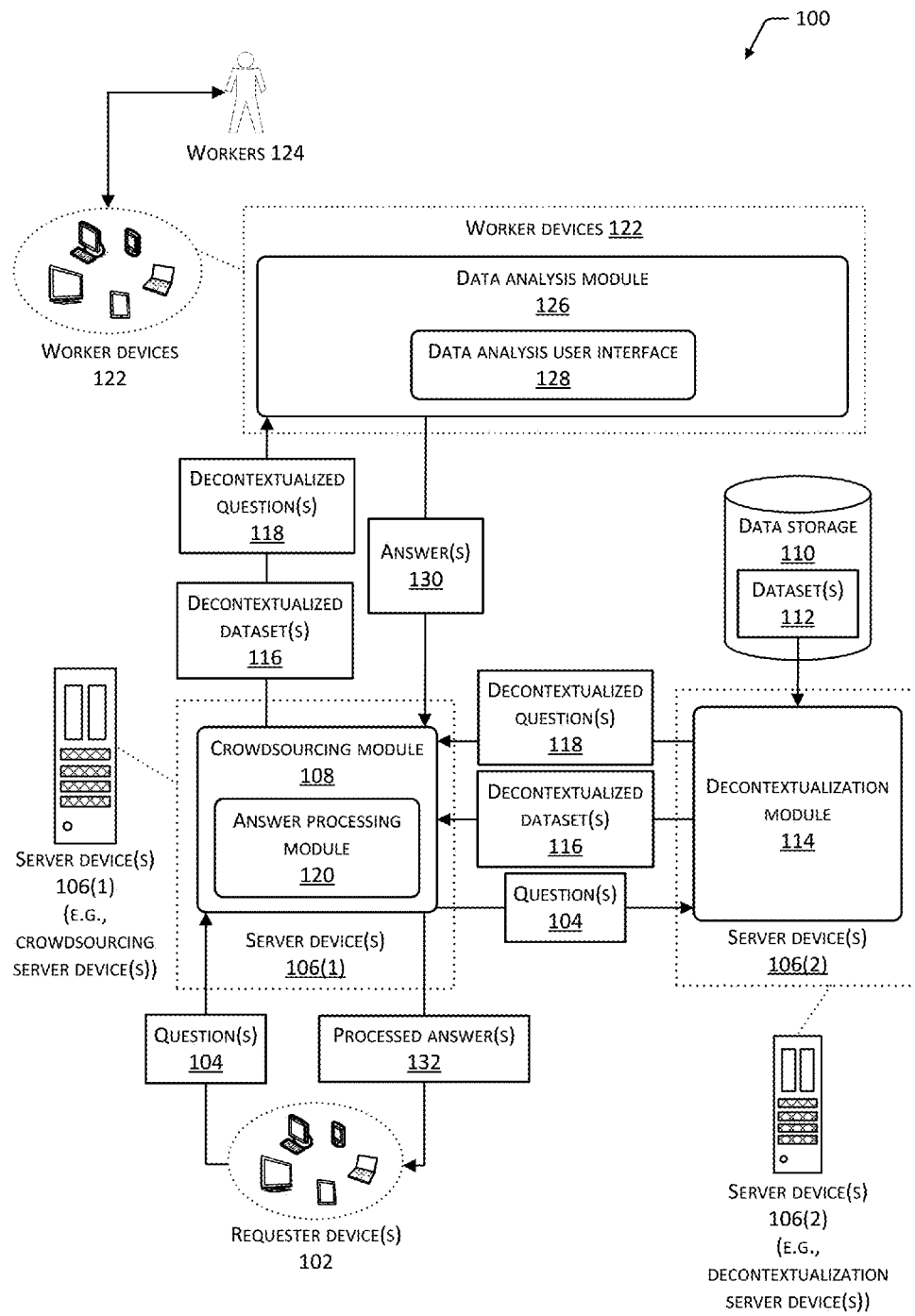
FIG. 1 depicts an environment for distributing data analysis tasks to workers in a crowdsourcing framework including providing decontextualized data to workers for analysis, and processing the answers received from the workers to generate a processed answer to a question.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for crowdsourcing the analysis of data associated with computing system operations, to identify errors, security problems, performance issues, or other types of anomalous behavior in the computing systems. In many scenarios, one or more sets of computing systems operations data may be monitored to identify anomalies in the performance of computing systems that may include, but are not limited to, computing devices, clusters of computing devices, communications networks, network infrastructure devices, data storage systems, and so forth. Although some such monitoring may be automated, the effectiveness of such automation may not achieve parity with the information processing and pattern recognition capabilities of the human brain. Accordingly, implementations provide for the distribution of one or more datasets to a plurality of workers in a crowdsourcing framework to enable the workers to answer one or more questions by analyzing the dataset(s).

Crowdsourcing may refer to a method for soliciting contributions of services, ideas, content, answers, or other information from a plurality of workers, where workers may include individuals or groups of individuals. Such contributions may be provided for free by the workers, without any value or consideration provided in return. Alternatively, the contributions may be provided in return for any type of value or consideration, including but not limited to monetary payment, products, or services. Contributions may also be provided in return for coupons or discounts for products or services, or in return for points, credits, or tokens that are redeemable for products, services, or money. In some cases, the contributions may be provided in return for recognition in the form of the publication, promotion, or enhancement of a worker's skills, knowledge, business, status, or credentials. Crowdsourcing may take place within a crowdsourcing framework in which one or more requestors pose a question to be answered by one or more workers based on an analysis or examination of one or more datasets. The requestors may include one or more individuals, devices, or processes that formulate a question to be answered through crowdsourcing. Within the crowdsourcing framework, the question and one or more datasets relevant to the question may be provided to the workers. The workers may formulate an answer to the question based on their analysis or examination of the provided datasets. The answers received from the workers may be correlated, analyzed, combined, or otherwise processed to determine a processed answer that is provided to the requestor(s).

In implementations, prior to sending the dataset(s) to the workers for analysis, the datasets may be at least partly decontextualized to remove or otherwise alter contextual information that may provide a context of the data being analyzed. Contextual information may include any information that identifies or otherwise describes practices, impacts, performance, products, services, personnel, customers, infrastructure, or other operational details regarding an organization such as a business. In some cases, contextual information may include sensitive, personal, or private information associated with an individual, a group of individuals, a corporation, or an organization. For example, in cases where the analyzed data is related to the performance or operations of computing systems for a business, contextual information may include but is not limited to one or more of the following: information describing corporate infrastructure or organization; computing system topology, architecture, capabilities, or identifications; communication network configurations; data storage structures; processes, modules, or applications executed by computing systems; geographic location of computing systems, support infrastructure, or personnel; and so forth. Contextual information may also include trends or projections related to financial performance or business performance. In some cases, contextual information may include any information that identifies a type of communication described by the data (e.g., a web page request or response, a sale transaction, a refund transaction, a user login, and so forth). Contextual information may also include data that indicates a source or destination of a communication described by the data. Contextual information may also include any information that at least partly enables inference, deduction, or reverse engineering of any of the types of contextual information described above.

For example, a dataset showing a rate of requests to a web site over time may be decontextualized to remove axis labels (e.g., request rate vs. time), descriptive text, or other indications that the data is associated with request rates or time. Decontextualization may also include altering a scale of the displayed data along one or more coordinate axes, inverting the data, normalizing the data to a baseline set of data, representing the data in alternate ways (e.g., as shapes, objects, colors, sounds, and so forth), combining multiple datasets of data, transforming the data, or otherwise obscuring or obfuscating an original source, meaning, or significance of the data. Decontextualizing may include removing, altering, obscuring, obfuscating, or hiding the contextual information included in the dataset(s) to be analyzed by workers. In some cases, the question to be answered by the workers may also be decontextualized in any of the ways that the data may be decontextualized. Because the workers may be members of the general public, outside of the business or organization whose operations are described by the data, the dataset(s) to be analyzed and the question to be answered may be decontextualized prior to sending the dataset(s) and the question to the workers. By decontextualizing the dataset(s) and the question, implementations may provide for the crowdsourced analysis of data while avoiding exposure of sensitive, personal, private, confidential, or business-related information to the public.

FIG. 1 depicts an environment 100 for enabling the crowdsourced analysis of decontextualized data. As shown in FIG. 1, the environment 100 may include one or more requestor devices 102. In some cases, the requestor device(s) 102 may be owned by, operated by, or otherwise associated with individuals (e.g., requestors) who formulate, identify, or otherwise determine one or more questions 104 to be answered through a crowdsourcing framework. The requestor device(s) 102 may comprise any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, and so forth.

In some implementations, the requestor(s) associated with the requestor device(s) 102 may be system administrators, engineers, developers, testers, managers, or other personnel affiliated with a business or other organization that maintains and operates any number of computing systems. For example, the requestor(s) may be affiliated with an online business or other organization that maintains and operates computing systems to provide one or more web sites. The question(s) 104 may include questions related to the performance or operations of the computing systems that are maintained and operated by the business or other organization. For example, the question(s) 104 may include but are not limited to the following:

Are there any anomalies that appear in one or more datasets during a period of time? An anomaly may include data that is higher than, lower than, or otherwise outside a range that characterizes other data in the dataset relative to one or more coordinate axes. In this example question, and the other example questions described herein, the dataset(s) may include data describing one or more of the following: a rate of requests to a web site over time; a rate of logins to a web site over time; a latency or delay in processing requests or logins; a size of requests over time; a size of responses to requests over time; a distance from the request origin to a data center that processes the request; an error rate in processing the requests or the logins over time; a rate of orders, purchases, or refunds at a web site (e.g., an e-commerce web site) over time; an origin location of requests (e.g., determined via geolocation based on Internet Protocol (IP) address); and so forth.

Are there any anomalies that appear in one or more datasets during a period of time following a particular event? The particular event may include a user login, a request to a web site, an order submitted to a web site, a boot or start of a computing system, a failure or shutdown of a computing system, and so forth.

Is there a correlation or relationship between multiple datasets? The correlation may be a direct correlation, an inverse correlation, a linear correlation, a quadratic correlation, an exponential correlation, a logarithmic correlation, and so forth. In some cases, the multiple datasets may include different types of data. For example, workers may be asked to compare multiple datasets that may include the rate of requests, the rate of errors in processing requests, the average compute time or latency to process a request, and so forth, and identify any correlations exhibits between the datasets. In such cases, the datasets may be normalized to a substantially similar scale in at least one coordinate axis prior to the presentation of the datasets to the workers.

Is a particular dataset substantially similar to one or more other datasets? In this case, the other datasets may be datasets that have been previously characterized as known good datasets that exhibit expected, nominal, typical, or optimal behavior of the computing systems.

Are one or more datasets different in some way than other datasets included in a plurality of datasets? Such differences may include different trends in the dataset(s) or differing features of the dataset(s), such as maxima, minima, periodicity, or other features.

Do multiple datasets exhibit a similar pattern of behavior? In such cases, the similarity may include identical patterns of behavior, or patterns of behavior that are substantially similar.

Is a particular dataset characterized by periodic behavior? In such cases, the workers may be asked to estimate a periodicity or frequency of the data by identifying peaks or troughs in the data, by estimating a width of a repeating pattern in the data, or by identifying any other pattern in the data.

Is a dataset characterized by a curve? In this case, the workers may be asked by identify a curve that substantially fits the dataset. For example, the workers may be asked to choose a particular type of curve that substantially fits the dataset, such as a linear, polynomial, exponential, logarithmic, hyperbolic curve, and so forth, and to choose one or more parameters that characterize the curve. The workers may also be asked to draw a curve or compose a spline curve that substantially fits the dataset. Other types of questions are also supported by implementations.

The requestor device(s) 102 may communicate with one or more server device(s) 106 over one or more networks. The server device(s) 106 may include any type of computing device, including but not limited to a server computer, personal computer, network computer, cloud computing or distributed computing device, any of the types of computing devices described with reference to the requestor device(s) 102, or other types of computing devices. An example of the server device(s) 106 is described further with reference to FIG. 2. In some cases, any number of the server devices 106 may operate as a cluster, farm, cloud, or other distributed configuration to enable faster, more efficient, or more reliable performance of crowdsourcing operations through load balancing, failover support, parallel processing, or other techniques.

The server device(s) 106 may include various types of server devices 106. In implementations illustrated by FIG. 1, the server device(s) 106 may include server device(s) 106(1) (e.g., crowdsourcing server device(s)) and server device(s) 106(2) (e.g., decontextualization server device(s)). In some implementations, one or more functions of the server device(s) 106(1) and the server device(s) 106(2) may be performed by one or more common server device(s) 106.

Figure 11:
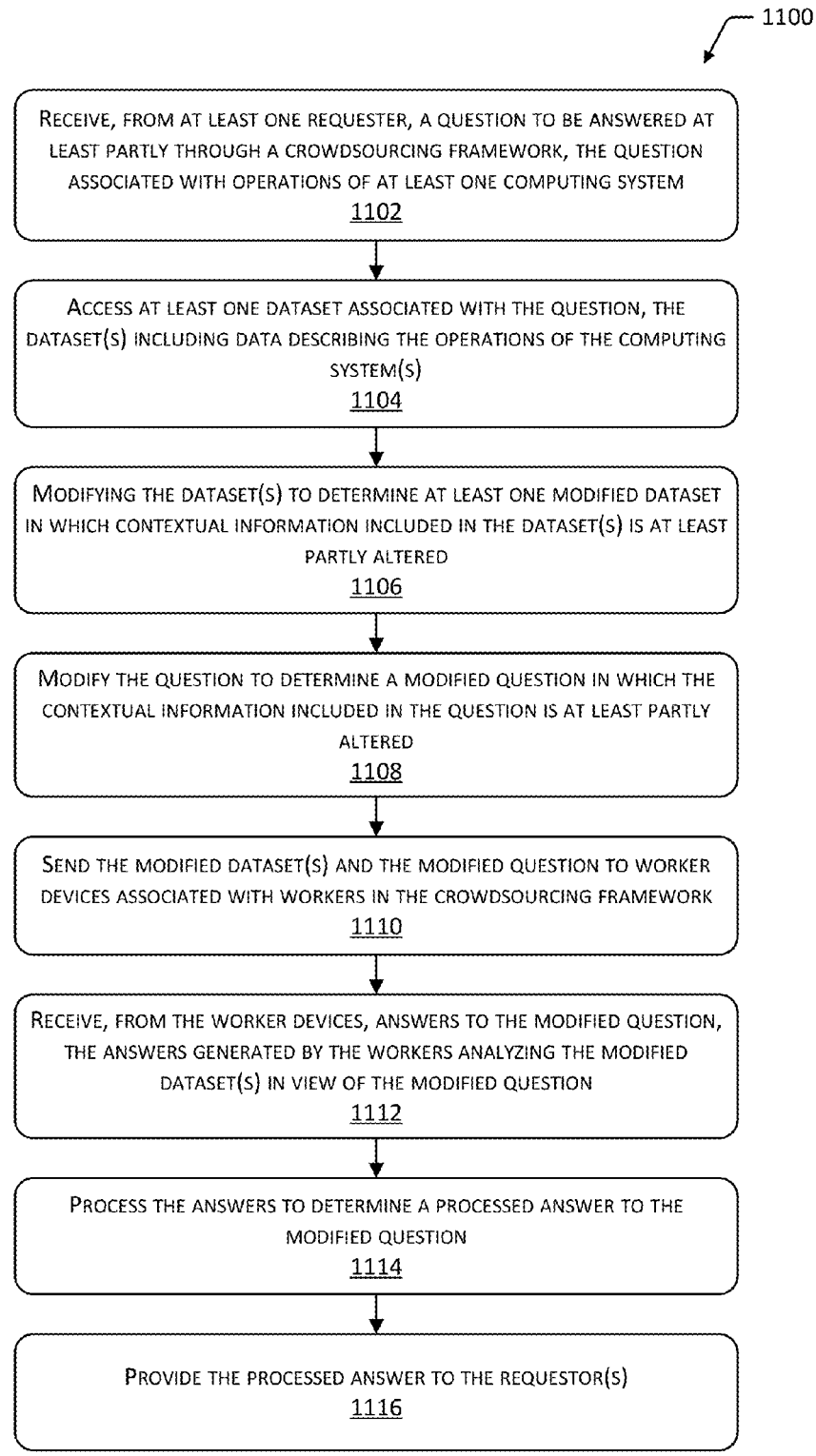
FIG. 11 depicts a flow diagram of a process for determining answers to questions based on a crowdsourced analysis of decontextualized data.
Figure 12:
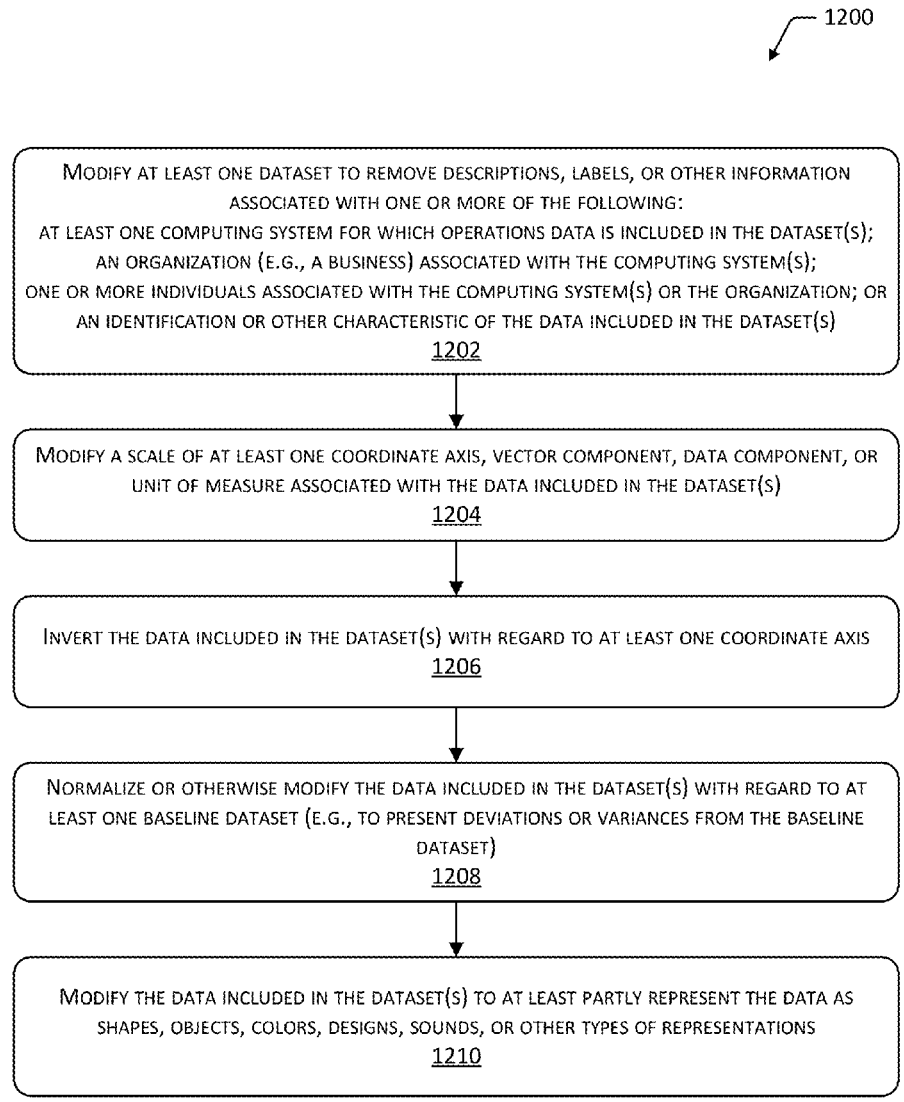
FIG. 12 depicts a flow diagram of a process for decontextualizing data prior to sending the data to workers for crowdsourced analysis.
Figure 13:
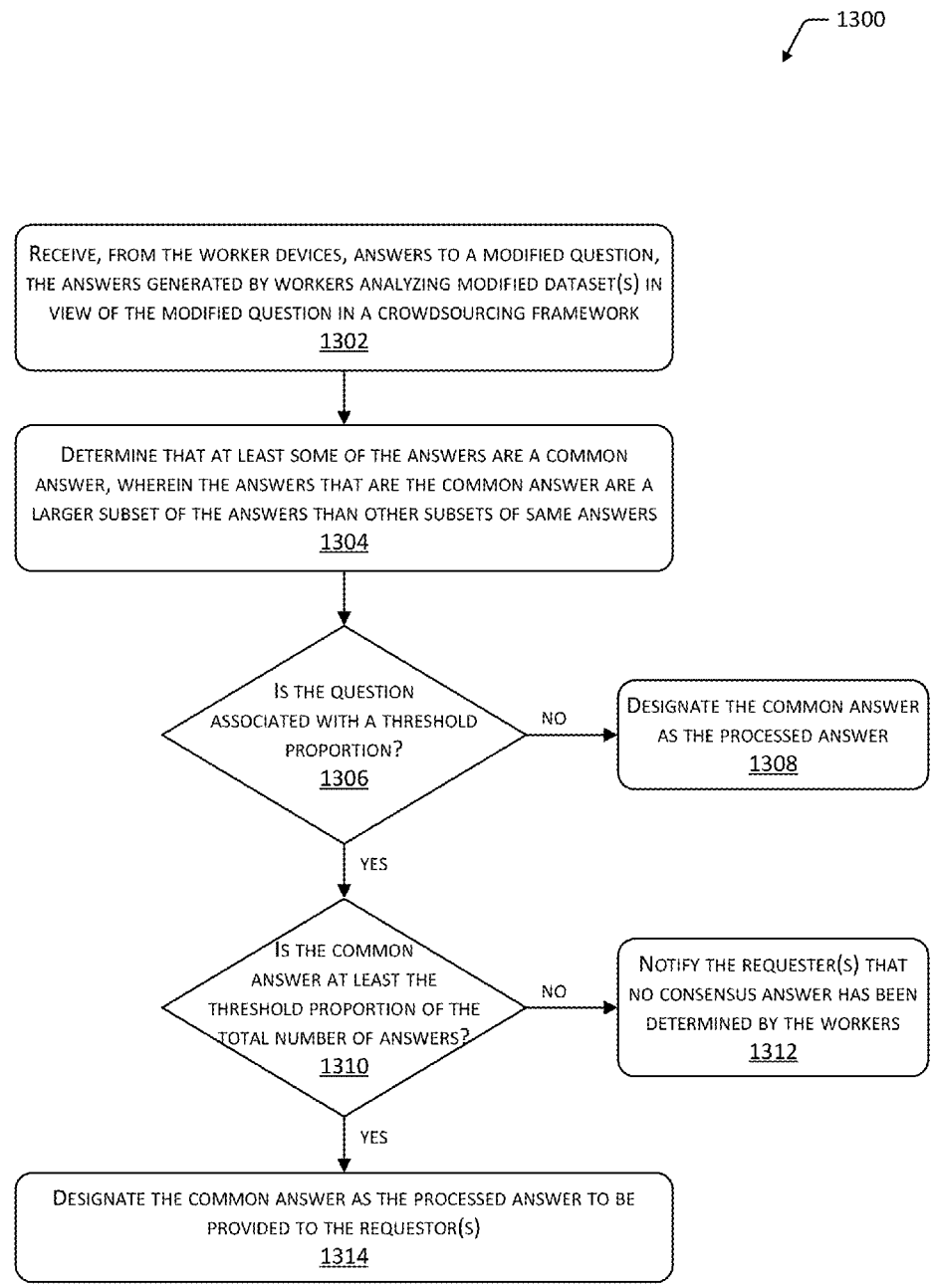
FIG. 13 depicts a flow diagram of a process for determining a processed answer based on a plurality of answers received from workers.

The server device(s) 106(1) may execute a crowdsourcing module 108, operations of which are described further with reference to FIGS. 11-13. As described further herein, the crowdsourcing module 108 may receive or otherwise access the one or more questions 104 provided by the requestor device(s) 102. Based on an analysis of the question(s) 104, the crowdsourcing module 108 may determine one or more datasets that are relevant to the question(s) 104. In some cases, one or more of the modules executing on the server device(s) 106(2) may analyze the question(s) 104 to determine the one or more relevant datasets. Alternatively, the question(s) 104 may include an identification of one or more relevant datasets. The crowdsourcing module 108 may communicate the question(s) 104, and information identifying the relevant dataset(s), to the server device(s) 106(2) (e.g., the decontextualization server device(s)).

The server device(s) 106(2) may access data storage 110, which may store one or more dataset(s) 112. A decontextualization module 114 executing on the server device(s) 106(2) may retrieve or otherwise access the one or more datasets 112 that are relevant to the question(s) 104. In cases where the question(s) 104 are related to the performance or operations of one or more computing systems or networks that are maintained or operated by the requestor(s), the dataset(s) 112 may include data related to the performance or operations of the computing systems or networks.

The data storage 110 may comprise any number of data storage systems that employ any type of data storage technology, including relational databases, non-relational databases, or both relational and non-relational databases. Although the data storage 110 is depicted as external to the server device(s) 106, implementations are not so limited. In some implementations, the data storage 110 may be at least partly incorporated into the server device(s) 106 as local storage.

In some implementations, the decontextualization module 114 may perform operations to decontextualize the dataset(s) 112 and generate decontextualized dataset(s) 116. In some cases, the decontextualization module 114 may also perform operations to decontextualize the question(s) 104 and generate decontextualized question(s) 118. The decontextualization is described further with reference to FIGS. 4-8 and 12. The decontextualized dataset(s) 116 and the decontextualized question(s) 118 may be communicated from the decontextualization module 114 to the crowdsourcing module 108. In implementations that do not include a separate server device 106(2) to perform decontextualization operations, the decontextualization operations may be performed by the crowdsourcing module 108.

In some implementations, the server device(s) 106(1) may execute an answer processing module 120 to perform operations to process the answers received from the workers. The processing of the answer(s) is described further with reference to FIG. 13. Although the answer processing module 120 is depicted as a sub-component, sub-module, or sub-process executed by the crowdsourcing module 108, in some implementations the answer processing module 120 may execute separately from the crowdsourcing module 108.

The server device(s) 106(1) may send the decontextualized dataset(s) 116 to one or more worker devices 122. In some cases, the decontextualized question(s) 118 may also be sent to the worker device(s) 122. Alternatively, in cases where the question(s) 104 may not include contextual information, the question(s) 104 may be sent to the worker device(s) 122 without having been decontextualized. The worker device(s) 122 may be owned by, operated by, or otherwise associated with one or more workers 124. The worker(s) 124 may include any number of individuals or groups of individuals. The worker device(s) 122 may include any type of computing device, including but not limited to those types of devices described above with reference to the requestor device(s) 102 and the server device(s) 106. An example of the worker device(s) 122 is described further with reference to FIG. 3.

In some implementations, the worker device(s) 122 execute a data analysis module 126. The data analysis module 126 may receive decontextualized question(s) 118 to be answered based on analysis or examination of the decontextualized dataset(s) 116. In some implementations, the data analysis module 126 may include a data analysis user interface 128 that presents the decontextualized question(s) 118 and the decontextualized dataset(s) 116 to the worker(s) 124. The data analysis user interface 128 may enable the worker(s) 124 to analyze or otherwise examine the decontextualized dataset(s) 116 in view of the decontextualized question(s) 118, and may enable the worker(s) 124 to formulate one or more answers 130 to the decontextualized question(s) 118. The answers 130 may include binary answers (e.g., yes or no, 1 or 0, and so forth), multiple choice answers (e.g., choose from A, B, C, or D, and so forth), or other types of answers. An example of the data analysis user interface 128 is described further with reference to FIGS. 9 and 10. Although the data analysis user interface 128 is depicted as a sub-component, sub-module, or sub-process executed by the data analysis module 126, in some implementations the data analysis user interface 128 may execute separately from the data analysis module 126.

The answer(s) 130 may be sent from the worker device(s) 122 to the server device(s) 106(1), and may be received by the crowdsourcing module 108. The crowdsourcing module 108, or the answer processing module 120, may analyze, correlate, combine, or otherwise process the answers to determine one or more processed answers 132. The processed answer(s) 132 may then be sent to the requestor device(s) 102 or otherwise provided to the requestors. The requestors may then examine the processed answer(s) 132 and determine if further investigation of the question(s) 104 is merited. Such further investigation may be performed manually by the requestors, or may be performed through further crowdsourcing to answer one or more other questions 104.

In some cases, the questions 104 may include control questions, or placebo questions, for which a correct answer is predetermined by the requestors. Such control questions may be incorporated into the processes described herein, as a check on or a measure of the accuracy of the workers 124 in answering questions. Implementations that employ control questions are described further with reference to FIGS. 14 and 15.

Although FIG. 1 depicts the requestor device(s) 102 as separate from the server device(s) 106, implementations are not so limited. In some implementations, the requestors may employ the server device(s) 106, including one or both of the server device(s) 106(1) and the server device(s) 106(2), as the requestor device(s) 102, logging into or otherwise accessing the server device(s) 106 to input question(s) 104, request a crowdsourced analysis to answer such question(s) 104, and access the processed answer(s) 132 generated through the crowdsourced analysis. Requestor(s) may also have access to the answer(s) 130 received from the worker device(s) 122.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Figure 2:
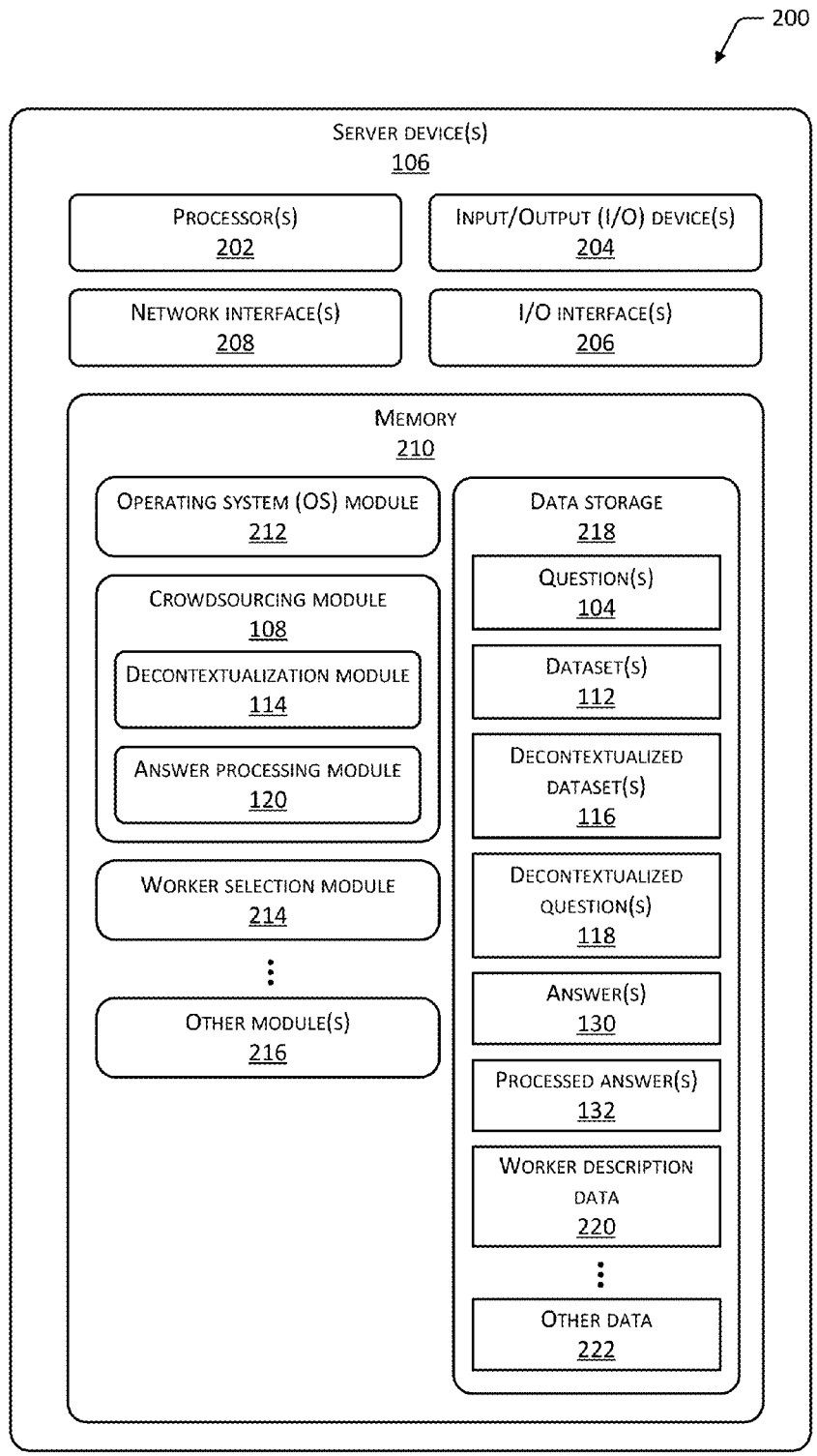
FIG. 2 depicts a block diagram of an example server device configured to receive a question from a requestor, retrieve and decontextualize data that is relevant to the question, provide the question along with the decontextualized data to worker devices, and process the answers received from the worker devices.

FIG. 2 depicts a block diagram 200 of an example of the server device(s) 106. As shown in the block diagram 200, the server device 106 may include one or more processors 202 configured to execute one or more stored instructions. The processor(s) 202 may comprise one or more cores.

The server device 106 may include one or more input/output (I/O) devices 204. The I/O device(s) 204 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 204 may also include output devices such as a display, an audio output device (e.g., a speaker), a printer, a haptic output device, and so forth. The I/O device(s) 204 may be physically incorporated with the server device 106, or may be externally placed.

The server device 106 may include one or more I/O interfaces 206 to enable components or modules of the server device 106 to control, interface with, or otherwise communicate with the I/O device(s) 204. The I/O interface(s) 206 may enable information to be transferred in or out of the server device 106, or between components of the server device 106, through serial communication, parallel communication, or other types of communication. For example, the I/O interface(s) 206 may comply with a version of the RS-232 standard for serial ports, or with a version of the Institute of Electrical and Electronics Engineers (IEEE) 1284 standard for parallel ports. As another example, the I/O interface(s) 206 may be configured to provide a connection over Universal Serial Bus (USB) or Ethernet. In some cases, the I/O interface(s) 206 may be configured to provide a serial connection that is compliant with a version of the IEEE 1394 standard. The server device 106 may also include one or more busses or other internal communications hardware or software that allow for the transfer of data between the various modules and components of the server device 106.

The server device 106 may include one or more network interfaces 208 that enable communications between the server device 106 and other networked devices, such as the requestor device(s) 102, the worker device(s) 122, or the data storage 110. The network interface(s) 208 may include one or more network interface controllers (NICs) or other types of transceiver devices configured to send and receive communications over a network.

The server device 106 may include one or more memories, described herein as memory 210. The memory 210 comprises one or more computer-readable storage media (CRSM). The CRSM may include one or more of an electronic storage medium, a magnetic storage medium, an optical storage medium, a quantum storage medium, a mechanical computer storage medium, and so forth. The memory 210 provides storage of computer-readable instructions that may describe data structures, program modules, processes, or applications, and other data for the operation of the server device 106.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system originally released by Linus Torvalds; any version of iOS® from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Research In Motion Ltd.® of Waterloo, Ontario, Canada; any version of VxWorks® from Wind River Systems® of Alameda, Calif., USA; or other operating systems.

The memory 210 may include the crowdsourcing module 108, the decontextualization module 114, and the answer processing module 120 as described above with reference to FIG. 1. The operations of these modules are described further with reference to FIGS. 4-13. In some implementations, the memory 210 may also include a worker selection module 214. The worker selection module 214 may identify one or more of the workers 124 that may be suitable for answering particular questions 104. Such identification may be based on skills, qualifications, credentials, or other characteristics of the worker(s) 124, and may also be based on a prior performance of the worker(s) 124 answering questions in the crowdsourcing framework. In some implementations, the worker(s) 124 may be vetted or evaluated through one or more evaluation questions in which they analyze one or more evaluation datasets. The answers to the evaluation question(s) may be employed by the requestors or others to determine whether any of the worker(s) 124 are suitable for answering the question(s) 104 within the crowdsourcing framework. The memory 210 may also include one or more other modules 216, such as a user authentication module or an access control module to secure access to the server device 106, and so forth. In some implementations, the other modules 216 may include a learning module or a decontextualizer, as described further with reference to FIGS. 14 and 15.

The memory 210 may include data storage 218 to store data for operations of the server device 106. The data storage 218 may comprise a database, array, structured list, tree, or other data structure, and may be a relational or a non-relational datastore. The data storage 218 may store one or more of the following: the question(s) 104, the dataset(s) 112 (e.g., prior to decontextualization), the decontextualized dataset(s) 116, the decontextualized question(s) 118, the answer(s) 130, or the processed answer(s) 132. In some implementations, the data storage 218 may store worker description data 220. The worker description data 220 may include information regarding qualifications, skills, credentials, or other characteristics of one or more workers 124 for use by the worker selection module 214 in determining which workers 124 to employ for analyzing the decontextualized dataset(s) 116. The worker description data 220 may also store results of the evaluation question(s) that may be employed to determine worker suitability as described above.

The data storage 218 may also store other data 222, such as user authentication information or access control data. In some cases, the other data 222 may include training data that is employed to train a decontextualizer, as described further with reference to FIGS. 14 and 15. In some implementations, at least a portion of the information stored in the data storage 218 may be stored externally to the server device 106, on other devices that are accessible to the server device 106 via the I/O interface(s) 206 or via the network interface(s) 208.

Figure 3:
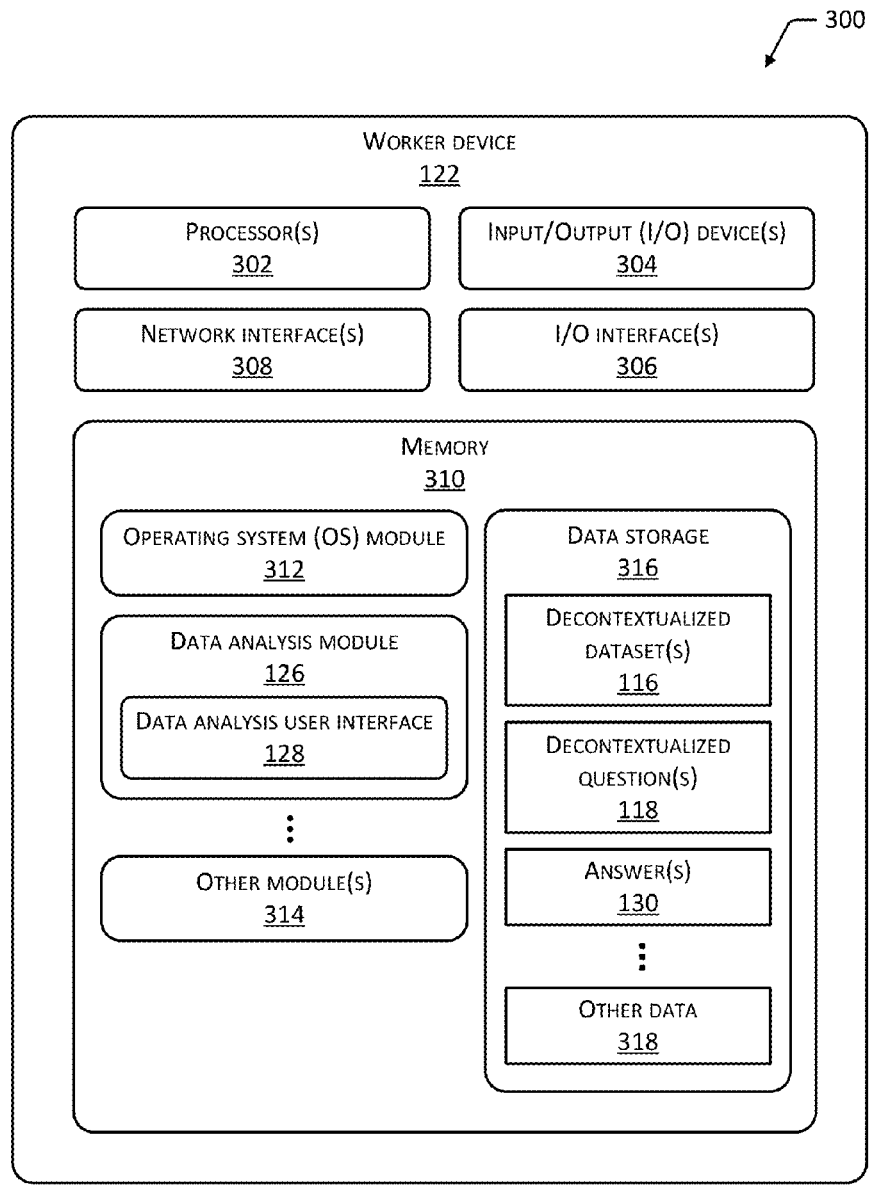
FIG. 3 depicts a block diagram of an example worker device configured to present decontextualized data to be employed by a worker in answering a question, and to provide the worker's answer to the question.

FIG. 3 depicts a block diagram 300 of an example of the worker device(s) 122. As shown in the block diagram 300, the worker device 122 may include one or more processors 302 configured to execute one or more stored instructions. The processor(s) 302 may comprise one or more cores. The worker device 122 may include one or more I/O devices 304, one or more I/O interfaces 306, and one or more network interfaces 308 as described above with reference to the I/O device(s) 204, the I/O interface(s) 206, and the network interface(s) 208 respectively.

The worker device 122 may include one or more memories, described herein as memory 310. The memory 310 comprises one or more CRSM. The CRSM may include one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the worker device 122. The memory 310 may include an OS module 312. The OS module 312 is configured to manage hardware resources such as the I/O device(s) 304, the I/O interface(s) 306, and the network interface(s) 308, and to provide various services to applications, processes, or modules executing on the processor(s) 302. The OS module 312 may include one or more of the operating systems described above with reference to OS module 212.

The memory 310 may include the data analysis module 126 and the data analysis user interface 128 as described above with reference to FIG. 1. The memory 310 may also include one or more other modules 314, such as a user authentication module or an access control module to secure access to the worker device 122, and so forth. In some implementations, one or both of the data analysis module 126 and the data analysis user interface 128 may execute as web applications within a web browser. In such cases, the memory 310 may include the browser. Implementations support the use of any type of browser.

The memory 310 may include data storage 316 to store data for operations of the worker device 122. The data storage 316 may comprise a database, array, structured list, tree, or other data structure, and may be a relational or a non-relational datastore. The data storage 316 may store one or more of the decontextualized dataset(s) 116, the decontextualized question(s) 118, or the answer(s) 130. In some cases, where the question(s) 104 are sent to the worker device(s) 122 without having been decontextualized, the data storage 316 may store the question(s) 104. The data storage 316 may also store other data 318, such as user authentication information or access control data. In some implementations, at least a portion of the information stored in the data storage 318 may be stored externally to the worker device 122, on other devices that are accessible to the worker device 122 via the I/O interface(s) 306 or via the network interface(s) 308.

FIGS. 4-8 illustrate non-limiting examples of various types of decontextualization. In the examples of FIGS. 4-8, the dataset 112 is depicted as a two-dimensional plot of request rate vs. time, such as showing a rate of requests made to one or more web sites. However, implementations are not limited to this format for the dataset(s) 112. The dataset(s) 112 may include but are not limited to data stored as one or more of the following: sets of ordered or unordered pairs, triples, or other n-tuples, where n is any number; tables with any number of rows or columns; unformatted data; n-dimensional plots, surfaces, or matrices, where n is any number; n-dimensional histograms or scatter plots, where n is any number; graphs, plots, and charts of any form, having any number of coordinate axes; hysteresis charts or graphs; log files; or any other type of formatted or unformatted text file.

Figure 4:
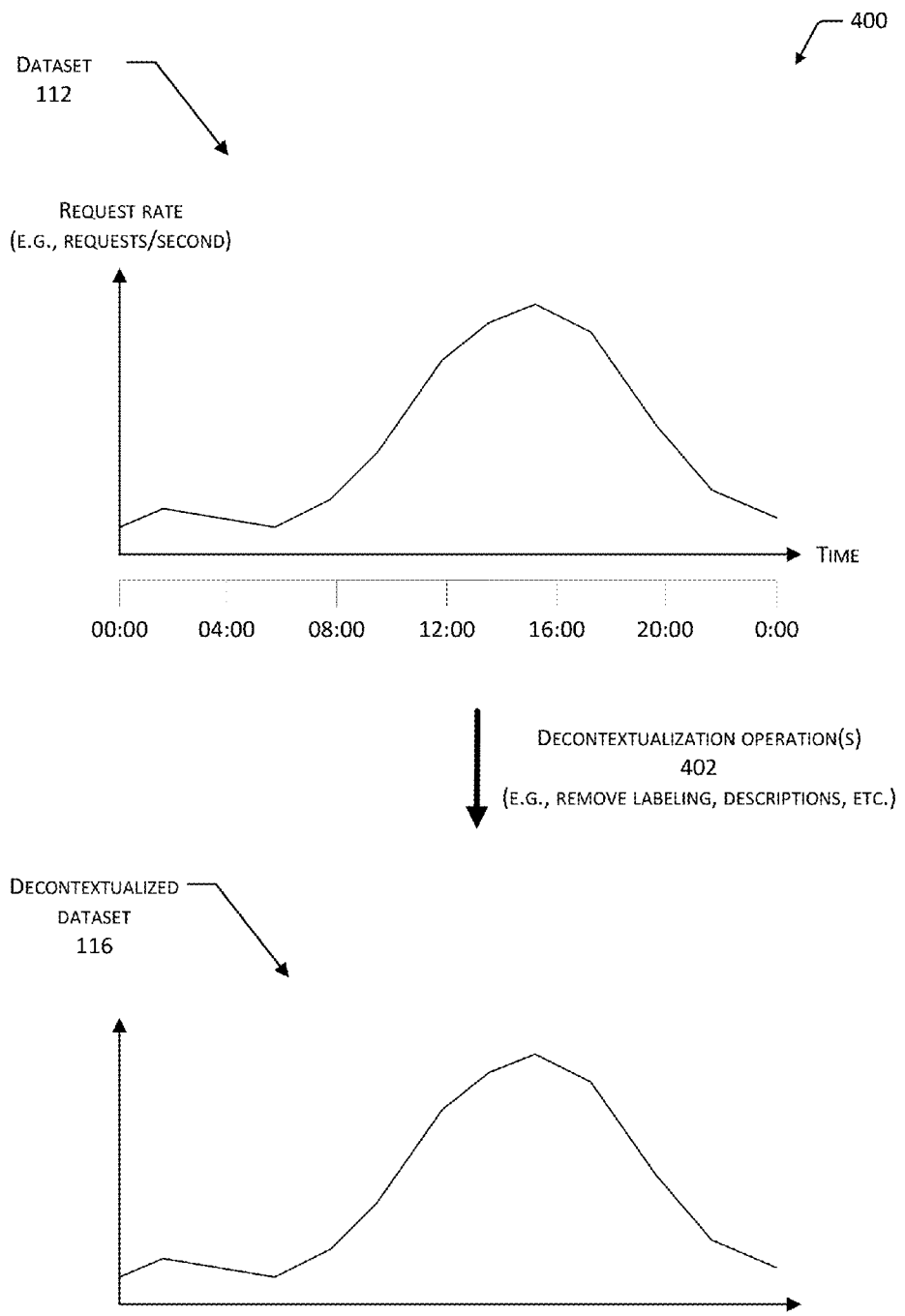
FIG. 4 depicts a schematic illustrating the decontextualization of a dataset, including removing or otherwise altering labels, descriptors, or other information that may indicate a context of the data.

FIG. 4 depicts a schematic 400 illustrating the decontextualization of a dataset 112. Through one or more decontextualization operations 402, contextual information included in the dataset 112 is removed or otherwise altered to generate the decontextualized dataset 116. Any number of decontextualization operations 402, of any type, may be performed to remove or otherwise alter the contextual information included in the dataset 112 prior to sending it to the worker devices 122. In the example of FIG. 4, the decontextualization operation(s) 402 include removing, omitting, or otherwise altering axis labels, descriptors, titles, or other information that may indicate a context of the data included in the dataset 112.

Figure 5:
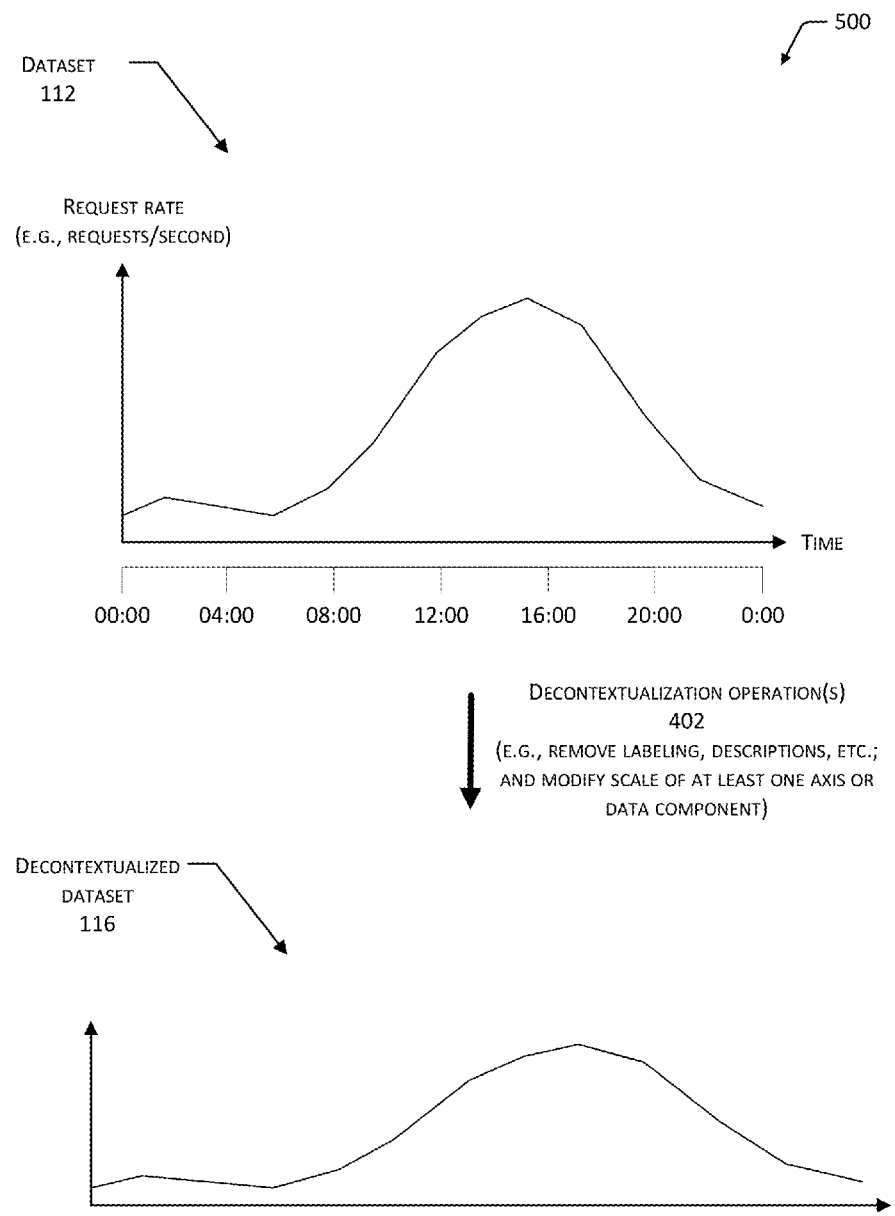
FIG. 5 depicts a schematic illustrating the decontextualization of a dataset, including altering at least one scale that may indicate a context of the data.

FIG. 5 depicts a schematic 500 illustrating the decontextualization of a dataset 112. In the example of FIG. 5, the decontextualization operation(s) 402 include altering at least one scale that may indicate a context of the data in the dataset 112. In the example shown, the y-axis of a line plot is scaled linearly such that y values of the data are scaled by a multiplicative constant. Implementations may scale the data along any number of coordinate axes or may scale the data included in any number of components of the data during decontextualization. The scaling may be according to a constant factor or a variable factor. In some cases, the scaling may vary along one or more coordinate axes according to any type of function or transform, including but not limited to linear, geometric, exponential, logarithmic, or other types of functions or transforms.

Figure 6:
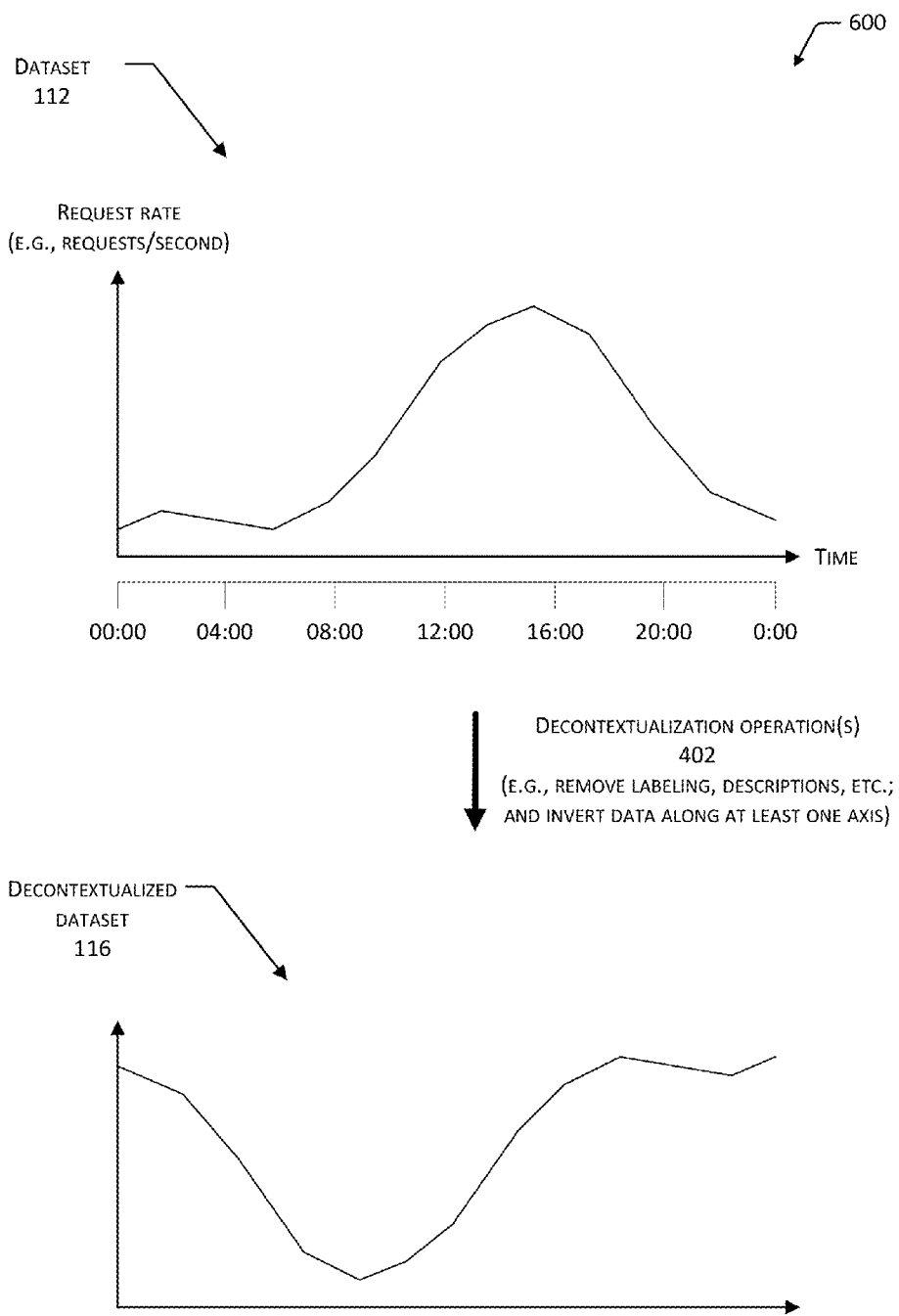
FIG. 6 depicts a schematic illustrating the decontextualization of a dataset, including inverting data along at least one coordinate axis to remove or obfuscate a context of the data.

FIG. 6 depicts a schematic 600 illustrating the decontextualization of a dataset 112. In the example of FIG. 6, the decontextualization operation(s) 402 include inverting data along at least one coordinate axis to remove or obfuscate a context of the data. In the example shown, the data of the dataset 112 is inverted in a direction along the y-axis about a particular value on the y-axis, and is also inverted in a direction along the x-axis about a particular value on the x-axis. Implementations may invert the data along any number of coordinate axes or relative to any value.

Figure 7:
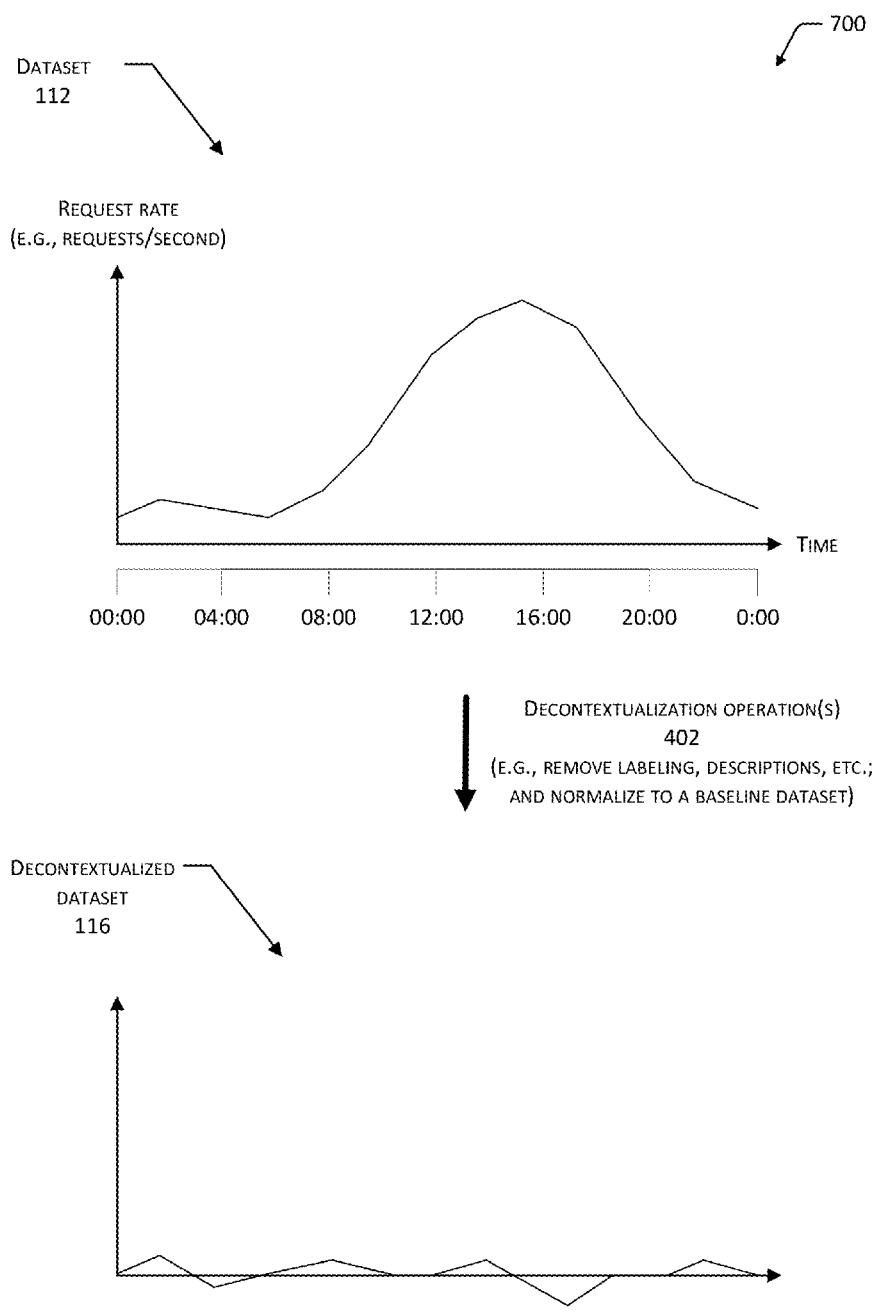
FIG. 7 depicts a schematic illustrating the decontextualization of a dataset, including normalizing the data relative to a baseline dataset.

FIG. 7 depicts a schematic 700 illustrating the decontextualization of a dataset 112. In the example of FIG. 7, the decontextualization operation(s) 402 include normalizing the data relative to a baseline dataset. In some cases, normalizing the data relative to a baseline dataset may include subtracting the one or more components of the data of the baseline dataset from corresponding component(s) of the data of the dataset 112. For example, the dataset 112 may include data describing the rate of requests to a web site during a period of time, e.g. over one day as shown in the example of FIG. 7. The baseline dataset may include similar data that is known good data or that reflects an expected or typical behavior of the computing systems. For example the baseline dataset may include data describing the variation of the request rate over the course of a typical or average day, during a day in which the computing systems are operating nominally, or during a day characterized by typical web site traffic. In such cases, the decontextualization operation(s) 402 may include subtracting the y component (e.g., the request rate) of the dataset 112 from the baseline dataset, or subtracting the baseline dataset from the dataset 112. Following the decontextualization operation(s) 402, the decontextualized dataset 116 may describe a variation or deviation of the dataset 112 from the baseline dataset over the period of time.

In cases where the dataset(s) 112 are decontextualized through a normalization operation as shown in the example of FIG. 7, the question(s) 104 asked of the workers 124 may include such questions as whether there are any zero crossings shown in the normalized plot, how many zero crossings are exhibited, whether the normalized plot is predominantly below or above the x-axis (or another axis), whether the normalized plot is substantially within or outside a particular range of y values, whether there are any spikes or dips in the plot, how many spikes or dips are exhibited, what is the most prominent feature in the normalized plot, what attributes describe this graph (e.g., flat, spikey, and so forth), whether the normalized plot is similar to a line or similar to a curve, and so forth.

Figure 8:
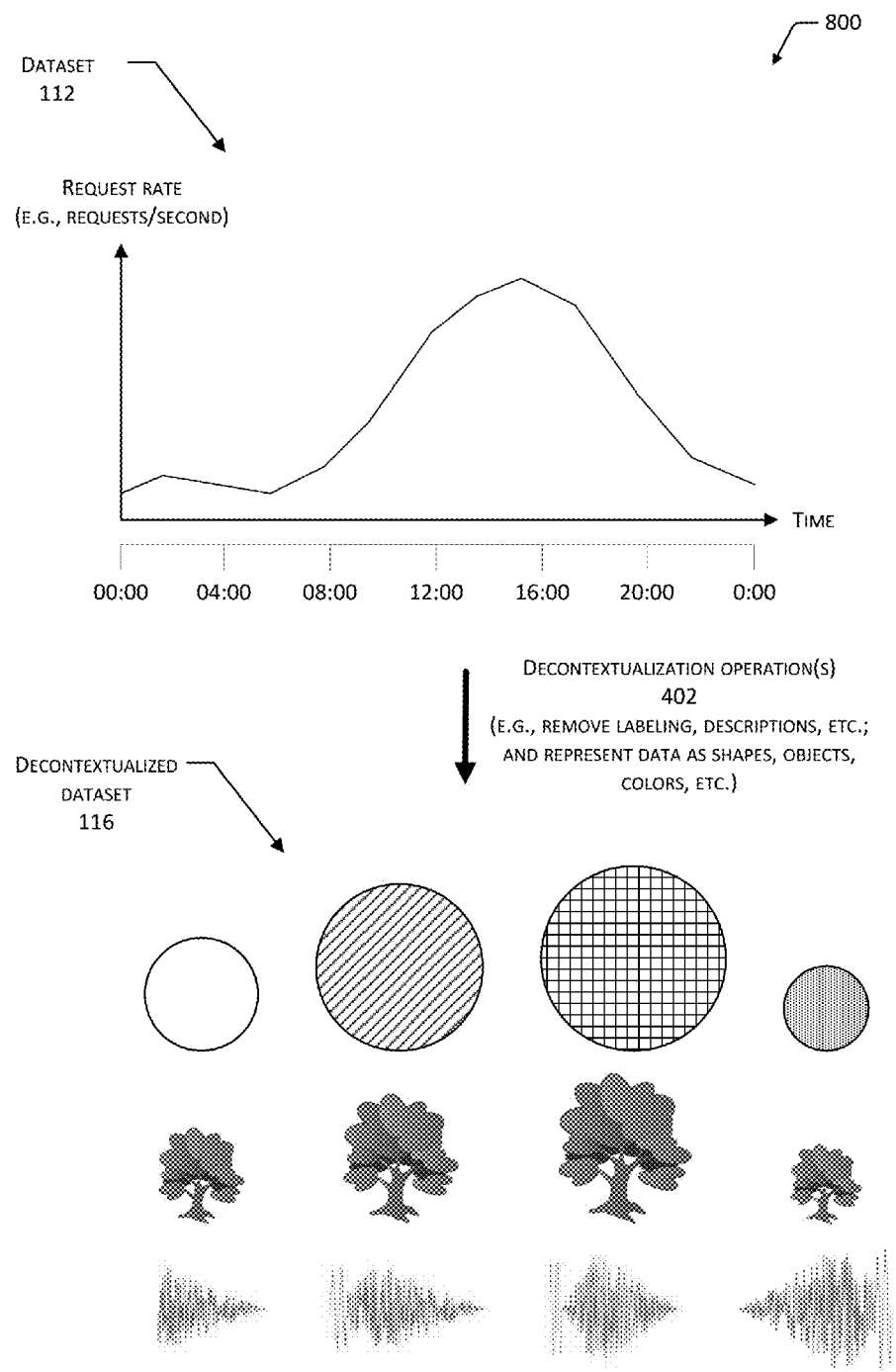
FIG. 8 depicts a schematic illustrating the decontextualization of a dataset, including representing the data as shapes, objects, colors, designs, and so forth.

FIG. 8 depicts a schematic 800 illustrating the decontextualization of a dataset 112. In the example of FIG. 8, the decontextualization operation(s) 402 include representing the data as shapes, objects, colors, designs, sounds, and so forth. In the examples shown, the decontextualization operation(s) 402 transform the dataset 112 to a decontextualized dataset 116 that includes shapes (e.g., circles) of various sizes and colors, and trees of various sizes. In this way, the data may be transformed into a different representation that, while based on the original data of the dataset 112, obscures or removes the context of the original data. For example, the particular shapes, objects, colors, designs, or other representations may be based on characteristics of the data in the dataset 112, including but not limited to one or more of the following: a size of the dataset 112; a mean, medium, mode, variance, deviation, range, or other statistical characteristic of the data; a frequency, period, amplitude, or other behavioral characteristic of the data, e.g., as determined through a Fourier transform or other transform of the data; a density or sparseness of the data; or other characteristics.

Moreover, implementations also support non-visual presentations of the decontextualized dataset 116 to the workers 124. For example, the decontextualization operation(s) 402 may include transforming the data of the dataset 112 into audio data such as any number of simultaneous or non-simultaneous sequences of tones that audibly describe one or more characteristics of the data. Such audio data is represented in FIG. 8 as various waveforms. In such cases, the worker device(s) 122 may play the audio included in the decontextualized dataset 116 and the worker(s) 124 may answer the question by listening to the audio and recognizing patterns in the audio or other aspects of the audio.

In cases where the dataset(s) 112 are decontextualized through a normalization operation as shown in the example of FIG. 8, the question(s) 104 asked of the workers 124 may include such questions as whether at least one of the presented objects or sounds is substantially different than the others or substantially similar to a comparison object or sound, whether one of the presented objects or sounds has a substantially notable (e.g., intense) color, shape, design, pattern, or audio characteristic, and so forth.

The various examples of the decontextualization operation(s) 402 illustrated in FIGS. 4-8 are not limiting of implementations. In some implementations, the dataset 112 may include text data such as lines from a log file generated during operations of one or more computing system(s). Text data may also include at least a portion of comments, reviews, profiles, or other text entered by users of a social network web site, a product or service review web site, an e-commerce web site, and so forth. In such cases, the decontextualization operation(s) 402 may include a redaction, editing, or alteration of the text to remove or obscure user names, user addresses, user telephone numbers, computer system hostnames or addresses, domain names, network names, date/time stamps, product names, company names, trademarks, other data that may be sensitive, personal, private, or other data that may be associated with the operations of a business or organization. The decontextualized dataset(s) 116 may then be provided to the worker(s) 124 who may analyze the remaining text to answer questions as to whether the text was likely generated by an automated process (e.g., a profile or comment spam bot) instead of a human, or other types of questions. The various decontextualization operation(s) 402 may be employed in any number and in any combination to generate the decontextualized dataset(s) 116.

Figure 9:
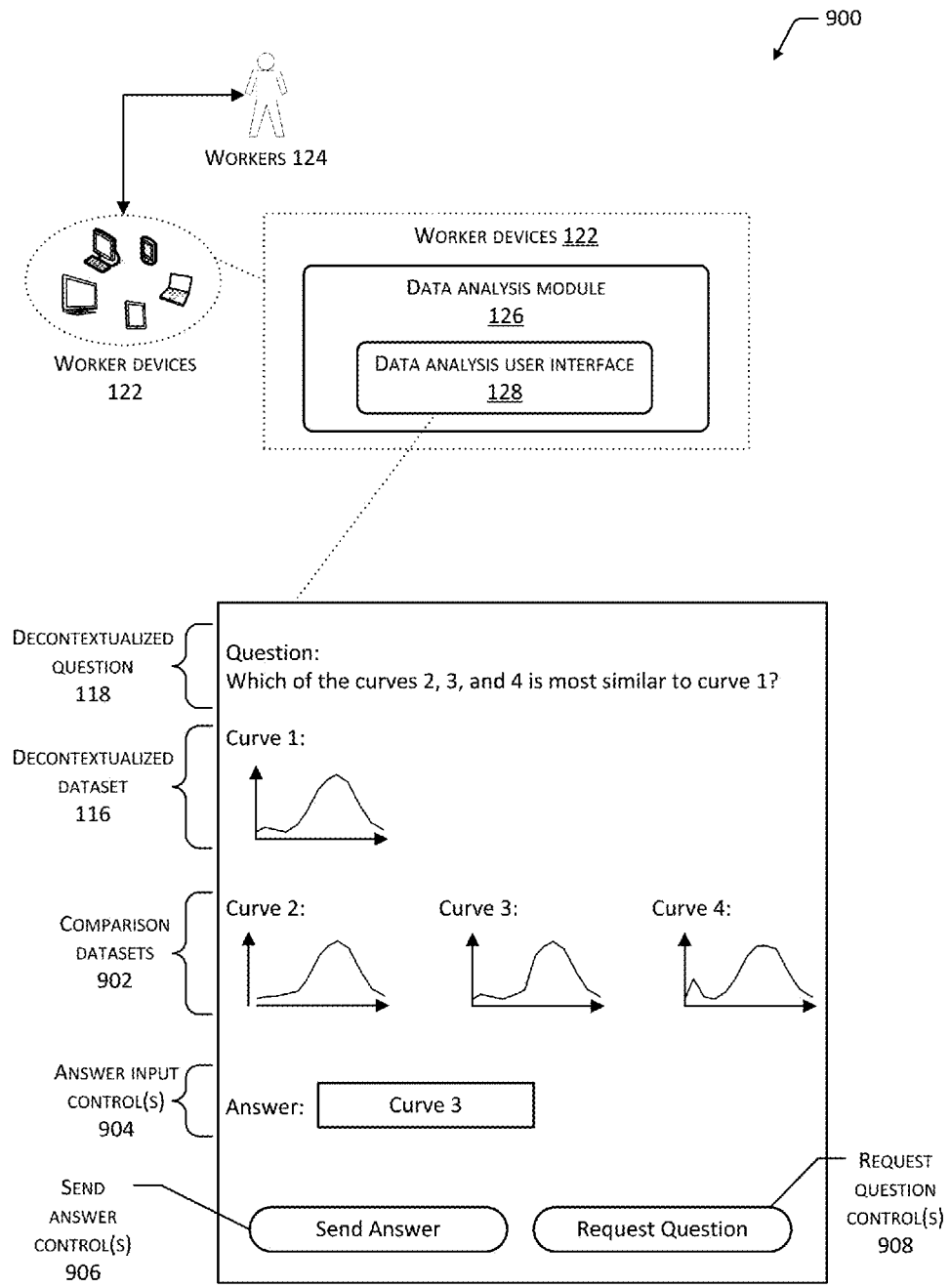
FIG. 9 depicts an example user interface that may be employed by a worker to analyze decontextualized data and answer a first example question in view of the decontextualized data.

FIG. 9 depicts a schematic 900 of an example of the data analysis user interface 128 that may be employed by the worker(s) 124 to analyze the decontextualized dataset(s) 116 and formulate the answer(s) 130. In some implementations, the data analysis user interface 128 may be implemented in a web application that executes within a web browser running on the worker device(s) 122. Implementations also support other types of user interfaces provided by other types of applications. Implementations support any type of the data analysis user interface 128, including but not limited to graphical user interfaces (GUIs), command-line user interfaces, or user interfaces that support the presentation of images, video, audio, graphics, haptic or touch-sensed output, or other types of information.

As shown in the example, the data analysis user interface 128 may present the decontextualized question 118 to the worker 124. In this example, the worker 124 is asked to determine which of three curves is "most similar" to a curve (e.g., "curve 1") that is a depiction of the decontextualized dataset 116. The data analysis user interface 128 displays three comparison datasets 902 showing three comparison curves. Alternatively, multiple decontextualized dataset(s) 116 may be presented to the worker 124, and the worker 124 may be asked which of the decontextualized dataset(s) 116 (e.g., dataset A or dataset B) is more similar to one or more other datasets. In such cases, at least one of the decontextualized dataset(s) 116 presented may be a control dataset and the question 104 may be control question for which the control dataset is the predetermined, correct answer.

The data analysis user interface 128 also includes one or more answer input controls 904, enabling the worker 124 to input his or her answer 130 to the decontextualized question 118. In this example, the data analysis user interface 128 includes one or more send answer controls 906, enabling the worker 124 to send the answer 130 to the server device(s) 106(1). The data analysis user interface 128 may also include one or more request question controls 908, enabling the worker 124 to request another decontextualized question 118 to answer.

Figure 10:
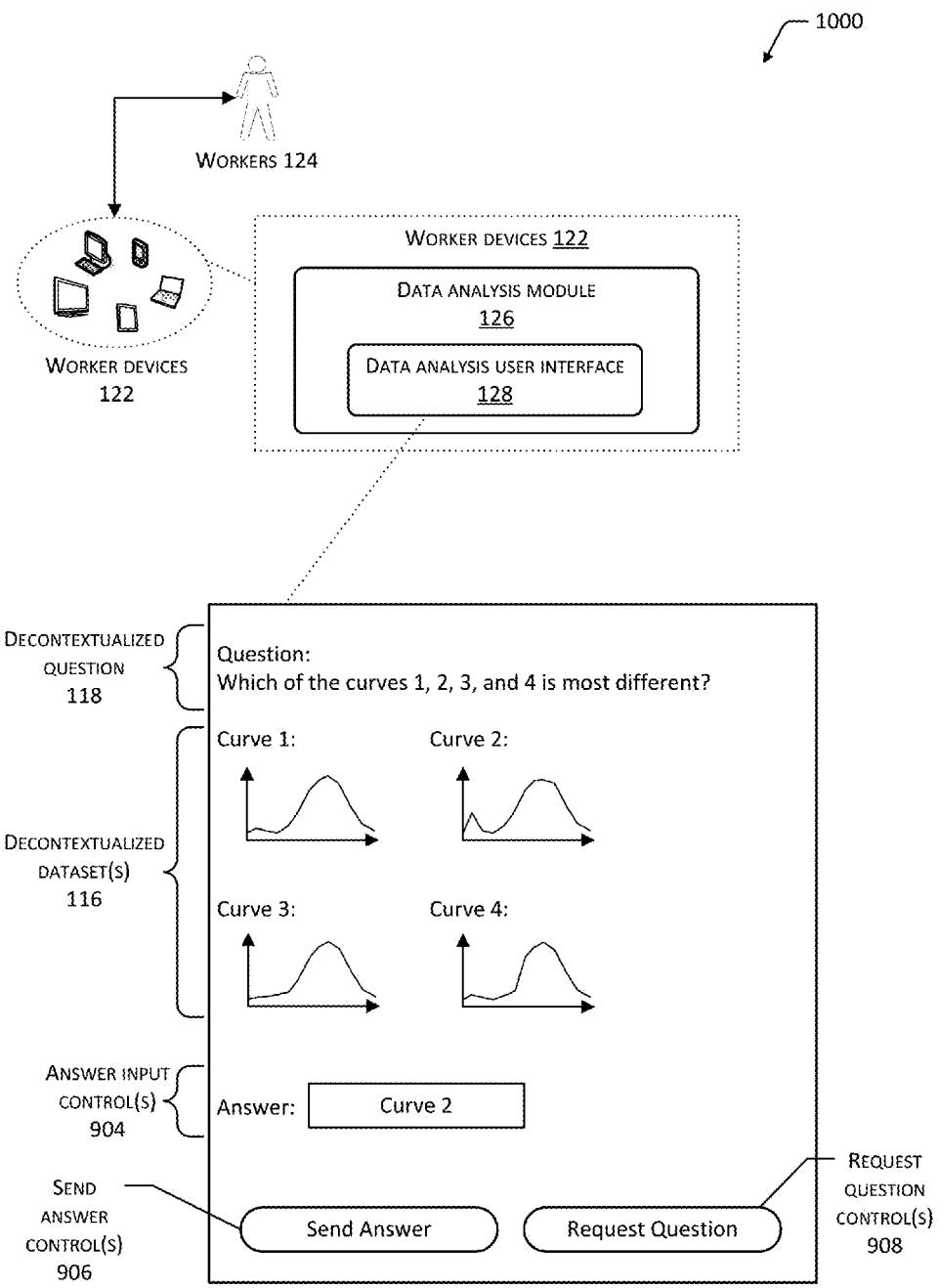
FIG. 10 depicts an example user interface that may be employed by a worker to analyze decontextualized data and answer a second example question in view of the decontextualized data.

FIG. 10 depicts a schematic 1000 of the example data analysis user interface 128, presenting another example of the decontextualized question 118 to the worker 124. In the example of FIG. 10, the worker 124 is asked to determine which of four curves is "most different," or which curve is an outlier or anomaly among the presented curves. The data analysis user interface 128 displays the decontextualized dataset(s) 116, including the four curves. Implementations support the presentation of any number of the decontextualized dataset(s) 116 for analysis by the worker(s) 124.

Although FIGS. 9 and 10 depict the data analysis user interface 128 as presenting a particular type of the decontextualized question 118, implementations are not limited to this example. Implementations may support any type of question 104 or decontextualized question 118 to be presented to the worker(s) 124, such as the other example questions described herein. Moreover, although the examples of FIGS. 9 and 10 depict the data analysis user interface 128 has presenting the decontextualized dataset(s) 116 in the form of graphics or still images, implementations may support other presentation formats such as video, audio, haptic or touch-sensed output, and so forth. Although the examples of FIGS. 9 and 10 depict the data analysis user interface 128 as including various controls in various locations in a single user interface window or view, implementations are not limited to this example. Any type of control may be employed to enable a user to enter information and commands to the data analysis user interface 128, including but not limited to buttons, text boxes, radio buttons, slider controls, tree views, list views, pop-up dialogs, and so forth. The controls and other displayed information may be presented in any time sequence, in any position, or in any arrangement, and may be distributed across any number of pages, windows, views, or dialogs.

FIG. 11 depicts a flow diagram 1100 of a process for crowdsourcing the analysis of decontextualized dataset(s) 116. Operations of the process may be performed by the crowdsourcing module 108, the decontextualization module 114, the answer processing module 120, other modules of the server device(s) 106, or modules executing on other devices.

At 1102, the question 104 is received from at least one requester, the question 104 to be answered at least party through a crowdsourcing framework such as that described above. In some implementations, the question 104 may be received from one or more requestor devices 102 associated with the at least one requestor. In some cases, the question 104 may be associated with or related to operations of one or more computing systems which may be maintained, operated, or monitored by the requestor(s).

At 1104, at least one dataset 112 associated with or relevant to the question 104 may be accessed from the data storage 110 or elsewhere. In some cases, the dataset(s) 112 may include data that describes the performance or operations of the computing system(s) that are operated, maintained, or monitored by the requestor(s).

At 1106, the dataset(s) 112 may be modified to generate or otherwise determine one or more modified datasets. Such modification may include a decontextualization of the data included in the dataset(s) 112 to generate the decontextualized dataset(s) 116 as described above. The decontextualization is described further with reference to FIG. 12.

At 1108, the question 104 may be modified to generate or otherwise determine a modified question. Such modification may include a decontextualization of the information included in the question 104 to generate the decontextualized question 118 as described above. The decontextualization of the question 104 may proceed similarly to the decontextualization of the dataset(s) 112, such that contextual information in the question 104 may be removed, obfuscated, or otherwise altered.

In some cases, the question 104 may be further modified based on one or more particular decontextualization operations employed to decontextualize the dataset(s) 112. For example, in cases where the decontextualization includes inverting a dataset 112 (e.g., as shown in FIG. 6), the question 104 may be modified such that the workers 124 are asked to identify a maximum of the data instead of a minimum.

At 1110, the modified dataset(s) and the modified question generated at 1106 and 1108 may be sent to one or more worker devices 122 associated with one or more workers 124 in the crowdsourcing framework. The data analysis module 126 and the data analysis user interface 128 may then enable the worker(s) 124 to formulate the answer(s) 130 to the question as described above. At 1112, the answer(s) 130 are received from the worker device(s) 122.

At 1114, the answer(s) 130 may be combined, correlated, analyzed, or otherwise processed to determine the processed answer 132 to the question. Such processing of the answer(s)

130 to determine the processed answer 132 is described further with reference to FIG. 13. At 1116, the processed answer 132 may be provided to the requestor(s) who submitted the question 104.

FIG. 12 depicts a flow diagram 1200 of a process for decontextualizing the dataset(s) 112 prior to sending the decontextualized dataset(s) 116 to the worker(s) 124 for crowdsourced analysis. Operations of the process may be performed by the crowdsourcing module 108, the decontextualization module 114, the answer processing module 120, other modules of the server device(s) 106, or modules executing on other devices. FIG. 12 describes various types of operations which may be performed to remove or alter contextual information included in the dataset(s) 112. Such operations may include, but are not limited to, the decontextualization operations 402 described above with reference to FIGS. 4-8. The operations described in FIG. 12 may be performed in any combination or in any order, serially or in parallel, to decontextualize the dataset(s) 112. Implementations are not limited to performing all the operations depicted in FIG. 12.

At 1202, the dataset(s) 112 may be modified to remove any descriptions, labels, titles, or other information that may provide a context for the data included in the dataset(s) 112, as described above with reference to FIG. 4. Such information may include alphanumeric text, symbols, colors, shapes, designs, or other types of information. The information may be associated with, describe, or identify one or more of the following: the computing system(s) (e.g., device(s), network(s), database(s), and so forth) for which operations or performance data is included in the dataset(s) 112; a business or other organization associated with the computing system(s); individual(s) associated with the computing system(s), the business, or other organization, such as employees or customers of a business; an identification or another characteristic of the data included in the dataset(s) 112 (e.g., any information indicating what the data is or where it came from); or any other types of contextual information described herein.

At 1204, the dataset(s) 112 may be altered to modify at least one scale of at least one coordinate axis, vector component, data component, or unit of measure associated with the data included in the dataset(s) 112. In some implementations, this may proceed as described above with reference to FIG. 5.

At 1206, the dataset(s) 112 may be modified to invert the data included in the dataset(s) 112 with respect to at least one coordinate axis or data component. In some implementations, this may proceed as described above with reference to FIG. 6.

At 1208, the dataset(s) 112 may be altered to normalize or otherwise modify the data included in the dataset(s) 112 relative to at least one baseline dataset. As described above with reference to FIG. 7, such normalization may generate decontextualized dataset(s) 116 that depict deviations or variances of the dataset(s) 112 from the baseline dataset(s).

At 1210, the dataset(s) 112 may be modified to at least partly represent the data included in the dataset(s) 112 as shapes, objects, color, designs, sounds, or other types of representations. In some implementations, this may proceed as described above with reference to FIG. 8. In implementations, the various decontextualization operations 402 may be performed so that the contextualization information originally present in the dataset(s) 112 may not be derived based on an analysis or examination of the decontextualized dataset(s) 116. In this way, implementations may enable crowdsourced data analysis while safeguarding sensitive, private, personal, or business-related information included in the dataset(s) 112.

FIG. 13 depicts a flow diagram 1300 of a process for determining the processed answer 132 based on the plurality of answers 130 received from the worker devices 122. Operations of the process may be performed by the crowdsourcing module 108, the decontextualization module 114, the answer processing module 120, other modules of the server device(s) 106, or modules executing on other devices.

At 1302, the answer(s) 130 may be received from the worker devices 122 as described above. At 1304, a determination may be made that at least some of the answer(s) 130 are a common answer, and that the answer(s) 130 that are the common answer form a larger subset of the answer(s) 130 than other subsets of same answers. For example, ten answers may be received from the workers. Four of the answers may be 42, three of the answers may be 44, two of the answers may be 40, and one of the answers may be 45. In this case, 42 may be designated as the common answer, given that it is the most frequently occurring answer among the answers 130. In some implementations, the common answer may be a same or identical answer among the answers 130. Alternatively, the common answer may be a substantially similar answer that is within a threshold range of being the same answer. Continuing with the above example, the answers 42.1, 41.8, and 42.4 may be determined to be similar enough to 42 such that the four answers are determined to share a common answer.

At 1306, a determination may be made whether the question 104 is associated with a threshold proportion. In some cases, the requestor(s) may specify one or more parameters or criteria, such as a threshold proportion, when specifying the question 104. If the question 104 is not associated with a threshold proportion, the process may proceed to 1308 and designate the common answer determined at 1304 as the processed answer 132 that is sent to the requestor(s).

If the question 104 does include a threshold proportion, the process may proceed to 1310. At 1310, a determination is made whether the common answer is shared by at least the threshold proportion of the answers 130. If not, the process may proceed to 1312, where the requestor(s) may be notified that no sufficiently common or consensus answer was reached by the workers 124. The requestor(s) may then choose to reformulate the question 104, adjust the method by which the dataset(s) 112 are decontextualized, or otherwise modify the way in which the question 104 or the dataset(s) 112 are presented to the workers.

If a determination is made at 1310 that the common answer is shared by at least the threshold proportion of the answers 130, the process may proceed to 1314. At 1314, the common answer determined at 1304 may be designated as the processed answer 132 to be provided to the requestor(s).

Figure 14:
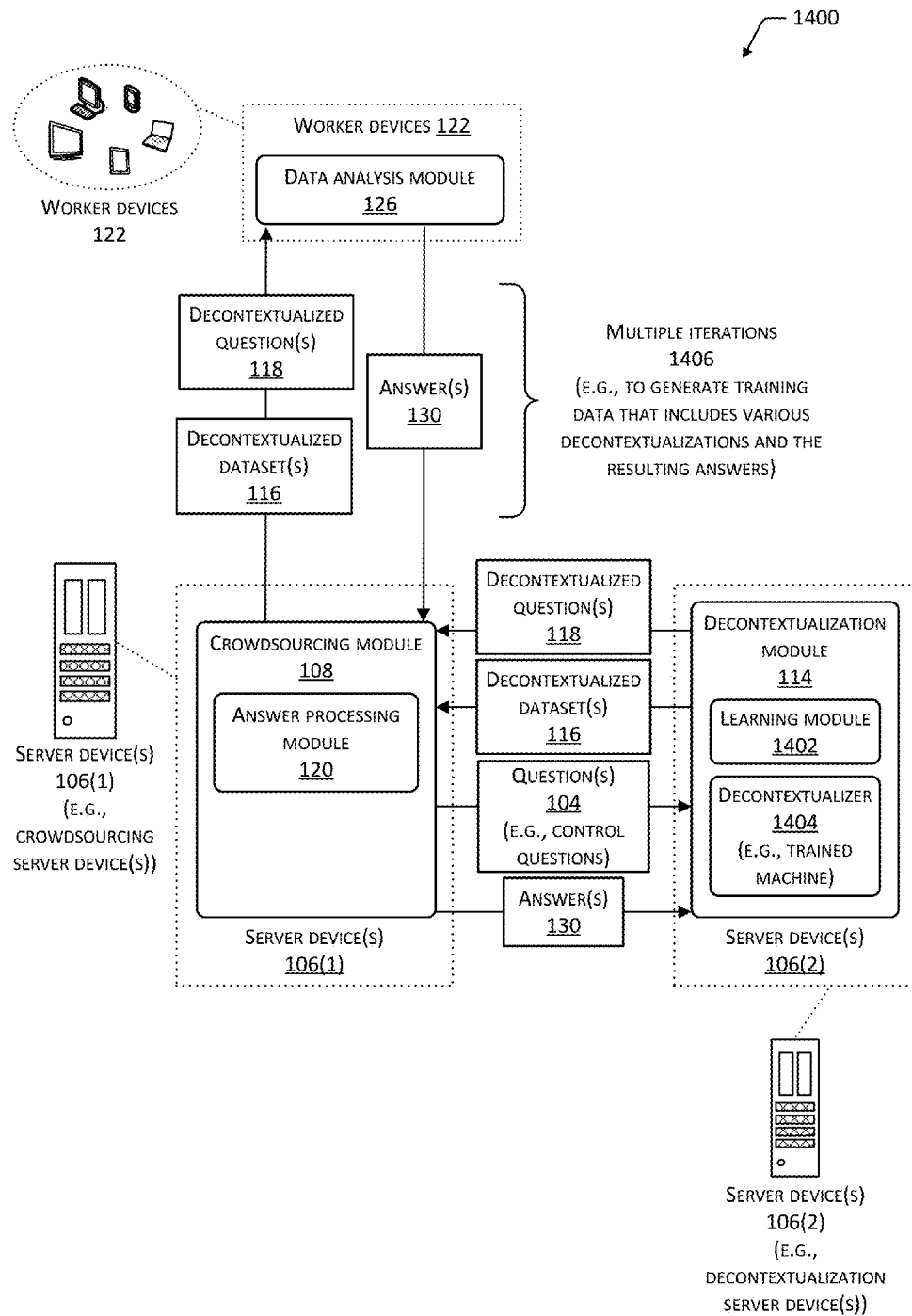
FIG. 14 depicts an environment for distributing data analysis tasks to workers in a crowdsourcing framework including providing decontextualized data to workers for analysis, and employing the answers received from the workers to train a machine (e.g., a decontextualizer) using machine learning operations.

In some implementations, the particular decontextualization operation(s) employed to generate one or both of the decontextualized dataset(s) 116 and the decontextualized question(s) 118 may be based on the operations of a decontextualizer or another machine (e.g., software module) that is trained through one or more machine learning operations. In some implementations, the decontextualizer may comprise a model, a set of decontextualization operations, or a set of decontextualization transforms that have been determined as suitable (e.g., refined, or optimal) for decontextualizing the dataset(s) 112 to be sent for analysis by the workers 124. FIG. 14 depicts an environment 1400 for distributing data analysis tasks to the worker device(s) 122 in a crowdsourcing framework, and employing the answers 130 to train a machine (e.g., a decontextualizer) using machine learning operations. The environment 1400 may include similar elements to those described above with reference to FIG. 1.

Although not shown in FIG. 14, the server device(s) 106(1) (e.g., the crowdsourcing server device(s)) may receive one or more question(s) 104 from the requester device(s) 102. In some implementations, the question(s) 104 may be control question(s) for which an answer (e.g., a correct answer) has been predetermined by the requester(s), or for which the answer is otherwise known. For example, the requester(s) may analyze the dataset(s) 112 stored in the data storage 110 and determine that there is a positive correlation between dataset A and dataset B, where the dataset(s) 112 describe operations of one or more computing systems or networks. The question 104 may be "is there a correlation between dataset A and dataset B?" and the predetermined answer to that question may be "yes." Accordingly, the question 104 may be described as a control question.

The question(s) 104 may be provided to the decontextualization module 114, which may determine one or more decontextualization operations to apply to the dataset(s) 112 and the question(s) 104. The decontextualization operation(s) may include, but are not limited to, one or more of the operations described above with reference to FIGS. 4-8. Determination of the decontextualization operation(s) may include randomly or pseudo-randomly selecting one or more decontextualization operations from a list or table of available decontextualization operations. The decontextualization module 114 may perform the selected decontextualization operation(s) to generate the decontextualized dataset(s) 116 and the decontextualized question(s) 118 as described above, which may then be sent to the crowdsourcing module 108.

The crowdsourcing module 108 may send the decontextualized dataset(s) 116 and the decontextualized question(s) 118 to the worker device(s) 122, and receive the answer(s) 130 from the worker device(s) 122. The answer(s) 130 may then be provided to the decontextualization module 114. In some implementations, the answer(s) 130 may be stored in training data in memory on the server device(s) 106(2). In some cases, information describing the particular decontextualization operation(s) employed may also be stored in the training data and associated with the answer(s) 130 that were generated based on the particular decontextualization operation(s) applied to the dataset(s) 112 analyzed by the workers 124.

A learning module 1402 executing on the server device(s) 106(2) may employ the training data in one or more machine learning operations to train a machine such as a decontextualizer 1404. In some cases, multiple iterations 1406 may be performed. Each iteration may include the application of one or more selected decontextualization operations to the dataset(s) 112 and the question(s) 104, and the receipt of the answer(s) 130 generated by the workers 124. The results of each such iteration may be incorporated into the training data. During the learning operations, the learning module 1402 may receive the answer(s) 130 from the workers 124 during multiple iterations, and may compare the received answer(s) 130 to the predetermined answer for the control question. In some cases, the learning module 1402 may apply a greater weight to one or more decontextualization operation(s) that generated those answer(s) 130 that are substantially similar to the predetermined answer to the control question. In this way, machine learning operations may train the decontextualizer 1404 to preferentially apply those decontextualization operation(s) that have been demonstrated to generate more accurate answer(s) 130.

Having trained the decontextualizer 1404 using machine learning, the decontextualization module 114 (or other software) may then employ the decontextualizer 1404 to decontextualize the dataset(s) 112 to be sent to workers in answering the question(s) 104 for which an answer is not predetermined, as described above with reference to FIGS. 11-13. In some cases, the decontextualizer 1404 may be further trained (e.g., refined) based on additional machine learning.

The decontextualized dataset(s) 116 may be decontextualized using one or more different decontextualization operations during each of the multiple iterations 1406. In some cases, different decontextualization operations may be employed during a same iteration. In some implementations, different worker devices 122 may receive differently decontextualized datasets 116 during a same iteration or during different iterations. In some implementations, a same set of worker devices 122 may be employed during multiple iterations. Alternatively, different worker devices 122 may be employed during different iterations.

Figure 15:
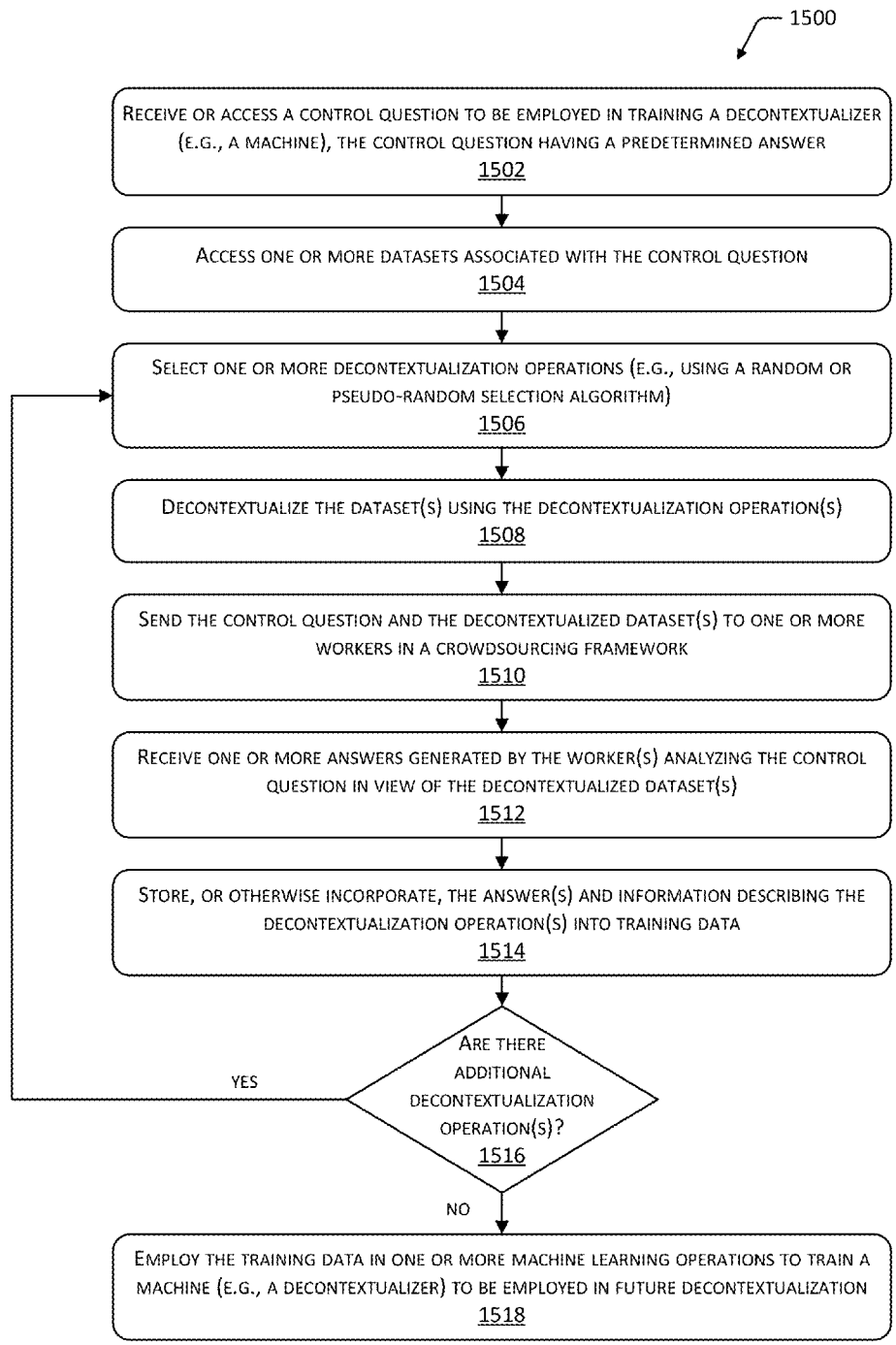
FIG. 15 depicts a flow diagram of a process for training a machine (e.g., a decontextualizer) using machine learning operations, employing training data generated within a crowdsourcing framework.

FIG. 15 depicts a flow diagram 1500 of a process for training a machine (e.g., the decontextualizer 1404) using machine learning operations, based at least partly on training data generated within a crowdsourcing framework. Operations of the process may be performed by the crowdsourcing module 108, the decontextualization module 114, the answer processing module 120, the learning module 1402, other modules of the server device(s) 106, or modules executing on other devices.

At 1502, the question 104 may be received. As described above with reference to FIG. 14, the question 104 may be a control question having a predetermined answer.

At 1504, one or more datasets 112 may be accessed, the dataset(s) 112 being associated with the control question. The dataset(s) may be accessed as described with reference to 1104.

At 1506, one or more decontextualization operations may be selected or otherwise determined. As described above, the decontextualization operation(s) may be selected using a random or a pseudo-random selection process. The decontextualization operation(s) may be selected using a simulated annealing technique to identify one or more (e.g., substantially optimal) decontextualization operation(s) from a plurality of available decontextualization operations. The decontextualization operation(s) may be selected using an exhaustive enumeration method that traverses all or a portion of a collection of available decontextualization operation(s) over multiple iterations of the process. One or more fitness functions may also be employed to identify the decontextualization operation(s) to be employed. In some cases, the selection of the decontextualization operation(s) may be determined at least partly by the requester(s) or other personnel.

At 1508, the one or more datasets 112 accessed at 1504 may be decontextualized based on the application of the one or more decontextualization operations determined at 1506. In some cases, the question 104 may also be decontextualized at 1508.

At 1510, the decontextualized dataset(s) 116 and the question 104 (in some cases the decontextualized question 118) may be sent to one or more worker devices 122. In some implementations, this information may be sent to the worker device(s) 122 through the server device(s) 106(1) as described above.

At 1512, the answer(s) 130 may be received. As described above, the answer(s) 130 may be generated by one or more workers 124 operating the worker device(s) 122, and analyzing the question 104 (or the decontextualized question 118) in view of the decontextualized dataset(s) 116.

At 1514, the answer(s) 130 and information describing the decontextualization operation(s) employed during this iteration may be stored or otherwise incorporated into the training data.

At 1516, a determination is made whether there are any additional decontextualization operation(s) to be employed to generate additional training data (e.g., whether additional iterations are to be performed). In some cases, as described above, the decontextualization operation(s) may be selected from a list. If there are additional operations available for selection from the list, the determination may be made that there are additional decontextualization operation(s) that may be applied. In such cases, the process may return to 1506 and perform another iteration of the process to generate additional training data based on one or more different decontextualization operations. If there are no additional decontextualization operations to be applied, then the process may proceed to 1518. At 1518, the training data accumulated over the multiple iterations 1406 may be employed in one or more machine learning operations to train the decontextualizer 1404.

Implementations support any number and type of machine learning techniques to train the decontextualizer 1404. In some cases, supervised machine learning may be employed, using training data that is labeled based on a degree to which the answer(s) 130 approximate the predetermined answer to the control question. Implementations may also employ unsupervised or semi-supervised machine learning techniques in which labeled data may be unavailable or partly available during the training of the decontextualizer 1404. Implementations support machine learning algorithms that may include, but are not limited to, one or more of the following: artificial neural networks, inductive logic programming, support vector machines (SVMs), clustering, Bayesian networks, decision tree learning, association rule learning, reinforcement learning, representation learning, similarity learning, metric learning, sparse dictionary learning, simulated annealing methods, fitness functions, identification of local or global maxima or minima, and so forth.

Following its training, the decontextualizer 1404 may describe a plurality of decontextualization operations that have been shown to generate substantially accurate answers from the workers 124 analyzing the question(s) 104 in the crowdsourcing framework. Accordingly, the decontextualizer 1404 may be employed in decontextualization operations to decontextualize the dataset(s) 112 that are sent to the workers 124 in answering the question(s) 104 for which an answer is not predetermined, as described above with reference to FIGS. 11-13. The decontextualizer 1404 may also be employed for other uses. For example, the decontextualizer 1404 may be employed to determine how to present real-time performance data, security information, or other operational information to one or more operators, system administrators, security analysts, or other personnel, to enable such personnel to more reliably or efficiently identify anomalies exhibited in the real-time data. The decontextualizer 1404 may also be employed to determine how to present data in educational, sales, marketing, scientific, or other environments.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. For example, although the examples herein describe the use of a crowdsourcing framework to analyze data associated with the performance or operations of computing systems, implementations are not so limited. Implementations may also enable the crowdsourced analysis of other types of data following their decontextualization. Such other types of data may include but are not limited to one or more of the following: scientific data; engineering or architectural design data; polling data associated with political campaigns or other types of public opinion data; data related to the operation of search algorithms; demographic data; and so forth. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
   receiving, at one or more servers, a question to be answered at least partly by a plurality of workers forming a crowdsourcing framework, the question associated with operations of at least one computing system;
   accessing at least one dataset associated with the question, the at least one dataset including data describing the operations of the at least one computing system and contextual information providing context to the data;
   receiving a selection of one or more decontextualizing operations to be performed on the at least one dataset associated with the question for altering the contextual information providing the context to the data of the at least one dataset;
   transforming the at least one dataset associated with the question to at least one decontextualized dataset by performing the selected one or more decontextualizing operations on the at least one dataset associated with the question, the selected one or more decontextualizing operations at least partly altering the contextual information providing the context to the data of the at least one dataset to transform the at least one dataset to the at least one decontextualized dataset, the contextual information describing one or more of:
      an attribute of the at least one computing system;
      a characteristic of the data included in the at least one decontextualized dataset comprising one or more of a visual or audio representation;
      information regarding an organization associated with the at least one computing system; or information regarding an individual associated with the at least one computing system;

transforming the question associated with the operations of the at least one computing system to a modified question by decontextualizing information included in the question, the transforming the question including at least partly altering the contextual information included in the question using the at least one decontextualized dataset transformed according to the selected one or more decontextualizing operations;

sending the at least one decontextualized dataset and the modified question altered using the at least one decontextualized dataset to a plurality of worker devices associated with the plurality of workers in the crowdsourcing framework;

receiving, at the one or more servers, a plurality of answers to the modified question from the plurality of worker devices, the plurality of answers generated by the plurality of workers analyzing the at least one decontextualized dataset in view of the modified question;

processing the plurality of answers to determine a processed answer to the modified question; and providing the processed answer to at least one requester as a response to the question associated with the operations of the at least one computing system.

2. The method of claim 1, wherein transforming the at least one dataset associated with the question to the at least one decontextualized dataset further comprises altering at least one scale of at least one coordinate axis associated with the data in the at least one dataset to transform the at least one dataset associated with the question to the at least one decontextualized dataset.

3. The method of claim 1, wherein transforming the at least one dataset associated with the question to the at least one decontextualized dataset further comprises inverting the data in the at least one dataset to transform the at least one dataset associated with the question to the at least one decontextualized dataset with regard to at least one coordinate axis.

4. The method of claim 1, wherein the transforming the at least one dataset associated with the question to further comprises normalizing the data in the at least one dataset to transform the at least one dataset associated with the question to the at least one decontextualized dataset with regard to at least one baseline decontextualized dataset, to present at least one variance of the data from the at least one baseline decontextualized dataset.

5. The method of claim 1, wherein the transforming the at least one dataset associated with the question to further comprises representing the data in the at least one dataset to transform the at least one dataset associated with the question to the at least one decontextualized dataset as one or more of a shape, an object, a color, a design, or a sound.

6. A system, comprising:
a processor; and
a memory device communicatively coupled to the processor, the memory device storing instructions which when executed by the processor, cause the processor to instantiate at least one computing device to implement one or more services, wherein the one or more services:
access at least one dataset associated with a question from at least one requester to be answered at least partly by a plurality of workers forming a crowdsourcing framework, the question associated with operations of at least one computing system, the at least one dataset including data describing the operations of the at least one computing system and contextual information providing context to the data;

receive a selection of one or more decontextualizing operations to be performed on the at least one dataset associated with the question for altering the contextual information providing the context to the data of the at least one dataset;

transforming the at least one dataset associated with the question to at least one decontextualized dataset by performing the selected one or more decontextualizing operations on the at least one dataset associated with the question, the selected one or more decontextualizing operations at least partly altering the contextual information providing the context to the data of the at least one dataset to transform the at least one dataset to the at least one decontextualized dataset;

transforming the question associated with the operations of the at least one computing system to a modified question by decontextualizing information included in the question, the transforming the question including at least partly altering the contextual information included in the question using the at least one decontextualized dataset transformed according to the selected one or more decontextualizing operations;

send the at least one decontextualized dataset and the modified question altered using the at least one decontextualized dataset to a plurality of worker devices associated with the plurality of workers in the crowdsourcing framework;

receive, from the plurality of worker devices, a plurality of answers to the modified question, the plurality of answers generated by the plurality of workers analyzing the at least one decontextualized dataset in view of the modified question; and process the plurality of answers to determine a processed answer to the modified question.

7. The system of claim 6, wherein the contextual information included in the at least one dataset describes one or more of:
an attribute of the at least one computing system;
information regarding an organization associated with the at least one computing system; or
information regarding an individual associated with the at least one computing system.

8. The system of claim 6, wherein the contextual information included in the at least one dataset describes one or more of:
a visual or audio representation of a characteristic of the data included in the at least one decontextualized dataset; or
an identification of the data included in the at least one decontextualized dataset.

9. The system of claim 6, wherein the processing of the plurality of answers to determine the processed answer to the modified question further comprises:
determining that at least a threshold proportion of the plurality of answers are a common answer; and
designating the common answer as the processed answer.

10. The system of claim 9, wherein the threshold proportion is based at least partly on the modified question.

11. The system of claim 6, wherein the data included in the at least one dataset comprises one or more of:
a rate of requests to a web site;
an amount of time spent processing the requests;

a delay time in processing the requests;
a rate of errors in processing the requests;
a size of requests to the web site; or
a size of responses to the requests.

12. The system of claim 6, wherein the at least one decontextualized dataset presents the data in a multidimensional plot to the plurality of workers.

13. One or more non-transitory computer-readable media storing instructions which, when executed by at least one processor, instruct the at least one processor to perform actions comprising:
    accessing at least one dataset including data and contextual information providing context to the data, the at least one dataset being associated with a question from at least one requester to be answered at least partly by a plurality of workers in a crowdsourcing framework;
    receiving a selection of one or more decontextualizing operations to be performed on the at least one dataset associated with the question for altering the contextual information providing the context to the data of the at least one dataset;
    transforming the at least one dataset associated with the question to at least one decontextualized dataset by performing the selected one or more decontextualizing operations on the at least one dataset associated with the question, the selected one or more decontextualizing operations at least partly altering the contextual information providing the context to the data of the at least one dataset to transform the at least one dataset to the at least one decontextualized dataset;
    transforming the question associated with operations of the at least one computing system to a modified question by decontextualizing information included in the question, the transforming the question including at least partly altering the contextual information included in the question using the at least one decontextualized dataset transformed according to the selected one or more decontextualizing operations;
    sending the at least one decontextualized dataset and the modified question at least partly altered using the at least one decontextualized dataset to a plurality of worker devices associated with the plurality of workers;
    receiving, from the plurality of worker devices, a plurality of answers to the modified question, the plurality of answers generated by the plurality of workers analyzing the at least one decontextualized dataset in view of the modified question; and
    processing the plurality of answers to determine a processed answer to the modified question.

14. The one or more non-transitory computer-readable media of claim 13, wherein:
    transforming the question associated with the operations of the at least one computing system to the modified question includes associated the modified question with the operations of at least one computing system; and
    altering the contextual information providing the context to the data includes altering the data describing the operations of the at least one computing system.

15. The one or more non-transitory computer-readable media of claim 13, the actions further comprising:
    modifying transforming the at least one dataset by representing the data included in the at least one dataset as one or more of a shape, an object, a color, a design, or a sound.

16. The one or more non-transitory computer-readable media of claim 13, wherein:
    the at least one decontextualized dataset includes a plot of data over time; and
    the modified question requests that the plurality of workers identify a time period during which the data exhibits an aberration.

17. The one or more non-transitory computer-readable media of claim 13, wherein:
    the at least one decontextualized dataset includes a first decontextualized dataset and a second decontextualized dataset; and
    the modified question requests that the plurality of workers determine whether the first decontextualized dataset is at least partly correlated with the second decontextualized dataset.

18. The one or more non-transitory computer-readable media of claim 13, wherein:
    the at least one decontextualized dataset includes a histogram of data; and
    the modified question requests that the plurality of workers determine at least one curve that characterizes the data.

19. The one or more non-transitory computer-readable media of claim 13, wherein the modified question requests that the plurality of workers determine that the at least one decontextualized dataset is substantially similar to at least one other decontextualized dataset.

20. The one or more non-transitory computer-readable media of claim 13, wherein:
    the at least one decontextualized dataset is normalized relative to at least one baseline dataset; and
    the modified question requests that the plurality of workers determine whether the at least one decontextualized dataset exhibits at least one variance from a norm corresponding to the at least one baseline dataset.

* * * * *